US012806765B2

(12) United States Patent
Kanamura et al.

(10) Patent No.: US 12,806,765 B2
(45) Date of Patent: Nov. 24, 2026

(54) ROBOT, CONTROL METHOD, AND RECORDING MEDIUM

(71) Applicant: CASIO COMPUTER CO., LTD., Tokyo (JP)

(72) Inventors: Toshiaki Kanamura, Tokyo (JP); Kayoko Onoda, Tokyo (JP); Wataru Nimura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/821,972

(22) Filed: Aug. 30, 2024

(65) Prior Publication Data

US 2025/0100132 A1 Mar. 27, 2025

(30) Foreign Application Priority Data

Sep. 22, 2023 (JP) ................................ 2023-158316

(51) Int. Cl.
*B25J 9/16* (2006.01)

(52) U.S. Cl.
CPC ............. *B25J 9/161* (2013.01); *B25J 9/1653* (2013.01); *B25J 9/1661* (2013.01)

(58) Field of Classification Search
CPC ......... B25J 9/161; B25J 9/1653; B25J 9/1661
USPC .......................................................... 700/245
See application file for complete search history.

(56) References Cited

U.S. PATENT DOCUMENTS

| | | | | |
|---|---|---|---|---|
| 6,529,802 | B1 * | 3/2003 | Kawakita | B25J 19/021 709/219 |
| 6,697,711 | B2 * | 2/2004 | Yokono | G06N 3/008 700/262 |
| 11,192,257 | B2 * | 12/2021 | Hayashi | B25J 9/1664 |
| 2006/0293787 | A1 * | 12/2006 | Kanda | G06N 3/008 700/253 |
| 2017/0368678 | A1 * | 12/2017 | Otsuka | A63H 11/00 |
| 2021/0132685 | A1 * | 5/2021 | Atsumi | G06F 3/03547 |

FOREIGN PATENT DOCUMENTS

| | | | |
|---|---|---|---|
| JP | 2003071763 | A | 3/2003 |
| JP | 2003159681 | A | 6/2003 |
| JP | 2020089929 | A | 6/2020 |
| JP | 2023115370 | A | 8/2023 |

OTHER PUBLICATIONS

Japanese Office Action (and English language translation thereof) dated Aug. 25, 2026, issued in counterpart Japanese Application No. 2025-152462.

* cited by examiner

*Primary Examiner* — Kira Nguyen
(74) *Attorney, Agent, or Firm* — Holtz, Holtz & Volek PC

(57) ABSTRACT

A robot includes a memory in which an action, that the robot is caused to execute as a response to a predetermined first external stimulus, is registered in advance by a user; and at least one processor. The at least one processor changes, in correspondence with at least any one of a performance count that the robot has been caused to execute the response to the predetermined first external stimulus in a past, an elapsed time from a pseudo-birth of the robot, and a state of the robot, a frequency at which the action is to be correctly executed as the response.

17 Claims, 12 Drawing Sheets

FIG. 6

ACTION INFORMATION 121

| No. | ACTION NAME | TRIGGER | ACTION CONTROL PARAMETER | | | | | | | EXECUTION COUNT | PREVIOUS EXECUTION DATE AND TIME |
|---|---|---|---|---|---|---|---|---|---|---|---|
| | | | MOVEMENT | ANIMAL SOUND | EXECUTION START TIMING | | MOVEMENT PARAMETER | | ANIMAL SOUND PARAMETER | | |
| | | | | | ORIGIN POINT | TIME | MOVEMENT TIME | MOVEMENT DISTANCE | SOUND | | |
| 1 | TEST 1 | UPON SPEECH RECOGNITION | UP | | FROM START | AFTER 1 SECOND | s1 | d1 | | 3 | TIME: XX:XX MONTH AND DAY (M/D): XX/XX YEAR: XXXX |
| | | | DOWN | | FROM END OF PREVIOUS ACTION | AFTER 0 SECONDS | s2 | d2 | | | |
| | | | LEFT | | FROM END OF PREVIOUS ACTION | AFTER 0 SECONDS | s3 | d3 | | | |
| | | | RIGHT | | FROM END OF PREVIOUS ACTION | AFTER 0 SECONDS | s4 | d4 | | | |
| | | | | 1 | FROM START | AFTER 1 SECOND | | | v1 | | |
| | | | | 2 | FROM END OF PREVIOUS ACTION | AFTER 0 SECONDS | | | v2 | | |
| | | | | 3 | FROM END OF PREVIOUS ACTION | AFTER 0 SECONDS | | | v3 | | |
| | | | | 4 | FROM END OF PREVIOUS ACTION | AFTER 0 SECONDS | | | v4 | | |
| 2 | TEST 2 | UPON SPEECH RECOGNITION | UPPER LEFT | | FROM START | AFTER 0.5 SECONDS | ... | ... | | ... | ... |
| | | | ... | | ... | ... | ... | ... | | | |
| | | UPON HEAD BEING PETTED | | ... | ... | ... | | | ... | | |
| 3 | TEST 3 | ... | ... | ... | ... | ... | ... | ... | ... | ... | ... |
| ⋮ | ⋮ | ⋮ | | | | | | | | | |

FIG. 9

COEFFICIENT TABLE 124(1)

| STATE PARAMETER | | CORRECTION COEFFICIENT | | | | | | | | | |
|---|---|---|---|---|---|---|---|---|---|---|---|
| | | VERTICAL MOVEMENT | | | | LEFT-RIGHT MOVEMENT | | | | MOVEMENT START TIME LAG | |
| | | SPEED | | AMPLITUDE | | SPEED | | AMPLITUDE | | | |
| | | ACTION DIRECTION | WEIGHTING COEFFICIENT | ACTION DIRECTION | WEIGHTING COEFFICIENT | ACTION DIRECTION | WEIGHTING COEFFICIENT | ACTION DIRECTION | WEIGHTING COEFFICIENT | ACTION DIRECTION | WEIGHTING COEFFICIENT |
| (1) EMOTION | HAPPY | + | 0.2 | + | 0.2 | + | 0.2 | + | 0.2 | ±0 | 0 |
| | UPSET | + | 0.2 | + | 0.2 | + | 0.2 | + | 0.2 | − | 0.2 |
| | NORMAL | ±0 | 0 | ±0 | 0 | ±0 | 0 | ±0 | 0 | ±0 | 0 |
| | SAD | − | 0.2 | − | 0.2 | − | 0.2 | − | 0.2 | ±0 | 0 |
| | DISINTERESTED | − | 0.2 | − | 0.2 | − | 0.2 | − | 0.2 | + | 0.2 |
| (2) PERSONALITY | CHIPPER | + | 0.1 | + | 0.1 | ±0 | 0 | ±0 | 0 | ±0 | 0 |
| | ACTIVE | + | 0.1 | + | 0.1 | + | 0.1 | + | 0.1 | − | 0.1 |
| | SHY | − | 0.1 | − | 0.1 | − | 0.1 | − | 0.1 | + | 0.1 |
| | SPOILED | − | 0.1 | − | 0.1 | ±0 | 0 | ±0 | 0 | ±0 | 0 |

FIG. 10

COEFFICIENT TABLE 124(2)

| STATE PARAMETER | | CORRECTION COEFFICIENT | | | | | | | | | |
|---|---|---|---|---|---|---|---|---|---|---|---|
| | | VERTICAL MOVEMENT | | | | LEFT-RIGHT MOVEMENT | | | | MOVEMENT START TIME LAG | |
| | | SPEED | | AMPLITUDE | | SPEED | | AMPLITUDE | | | |
| | | ACTION DIRECTION | WEIGHTING COEFFICIENT | ACTION DIRECTION | WEIGHTING COEFFICIENT | ACTION DIRECTION | WEIGHTING COEFFICIENT | ACTION DIRECTION | WEIGHTING COEFFICIENT | ACTION DIRECTION | WEIGHTING COEFFICIENT |
| (3) BATTERY LEVEL | 70% OR GREATER | ±0 | 0 | ±0 | 0 | ±0 | 0 | ±0 | 0 | ±0 | 0 |
| | 30% TO 70% | ±0 | 0 | ±0 | 0 | ±0 | 0 | ±0 | 0 | ±0 | 0 |
| | 30% OR LESS | - | 0.3 | - | 0.3 | - | 0.3 | - | 0.3 | - | 0.3 |
| (4) CURRENT LOCATION | HOME | ±0 | 0 | ±0 | 0 | ±0 | 0 | ±0 | 0 | ±0 | 0 |
| | FREQUENTLY VISITED LOCATION | ±0 | 0 | ±0 | 0 | ±0 | 0 | ±0 | 0 | ±0 | 0 |
| | LOCATION NOT FREQUENTLY VISITED | - | 0.1 | - | 0.1 | - | 0.1 | - | 0.1 | ±0 | 0 |
| | LOCATION VISITED FOR FIRST TIME | - | 0.2 | - | 0.2 | - | 0.2 | - | 0.2 | + | 0.2 |
| (5) CURRENT TIME | IMMEDIATELY AFTER WAKING UP | - | 0.2 | - | 0.2 | - | 0.2 | - | 0.2 | + | 0.2 |
| | NAP TIME | - | 0.1 | - | 0.1 | - | 0.1 | - | 0.1 | + | 0.1 |
| | IMMEDIATELY BEFORE BED TIME | - | 0.1 | - | 0.1 | - | 0.1 | - | 0.1 | + | 0.1 |

FIG. 11

FAMILIARITY TABLE 125 (1)

| ACTION NAME | DEGREE OF FAMILIARITY |
|---|---|
| TEST 1 | 2.5 |
| TEST 2 | 1.8 |
| TEST 3 | 3.7 |
| TEST 4 | 1.1 |
| TEST 5 | 2.7 |
| ⋮ | ⋮ |

FIG. 12

FAMILIARITY TABLE 125 (2)

| STATE PARAMETER | | DEGREE OF FAMILIARITY COEFFICIENT |
|---|---|---|
| (1) EMOTION | HAPPY | 1.2 |
| | UPSET | 0.8 |
| | NORMAL | 1.0 |
| | SAD | 0.8 |
| | DISINTERESTED | 0.5 |
| (2) PERSONALITY | CHIPPER | 1.2 |
| | ACTIVE | 1.2 |
| | SHY | 0.8 |
| | SPOILED | 0.8 |
| (3) BATTERY LEVEL | 70% OR GREATER | 1.0 |
| | 30% TO 70% | 1.0 |
| | 30% OR LESS | 0.6 |
| (4) CURRENT LOCATION | HOME | 1.1 |
| | FREQUENTLY VISITED LOCATION | 1.0 |
| | LOCATION NOT FREQUENTLY VISITED | 0.9 |
| | LOCATION VISITED FOR FIRST TIME | 0.7 |
| (5) CURRENT TIME | IMMEDIATELY AFTER WAKING UP | 0.6 |
| | NAP TIME | 0.8 |
| | IMMEDIATELY BEFORE BED TIME | 0.9 |

ROBOT, CONTROL METHOD, AND RECORDING MEDIUM

CROSS-REFERENCE TO RELATED APPLICATIONS

This application is based upon and claims the benefit of priority under 35 USC 119 of Japanese Patent Application No. 2023-158316, filed on Sep. 22, 2023, the entire disclosure of which, including the description, claims, drawings, and abstract, is incorporated herein by reference in its entirety.

FIELD OF THE INVENTION

The present disclosure relates generally to a robot, a control method, and a recording medium.

BACKGROUND OF THE INVENTION

Electronic devices that imitate living creatures such as pets, human beings, and the like are known in the related art. For example, Unexamined Japanese Patent Application Publication No. 2003-159681 describes a robot device that, when a specific input is provided, exhibits a specific action associated with the specific input.

SUMMARY OF THE INVENTION

A robot according to an embodiment of the present disclosure includes:

a memory in which an action, that the robot is caused to execute as a response to a predetermined first external stimulus, is registered in advance by a user; and at least one processor, wherein the at least one processor changes, in correspondence with at least any one of a performance count that the robot has been caused to execute the response to the predetermined first external stimulus in a past, an elapsed time from a pseudo-birth of the robot, and a state of the robot, a frequency at which to the action is to be correctly executed as the response.

BRIEF DESCRIPTION OF DRAWINGS

A more complete understanding of this application can be obtained when the following detailed description is considered in conjunction with the following drawings, in which.

Figure 5:
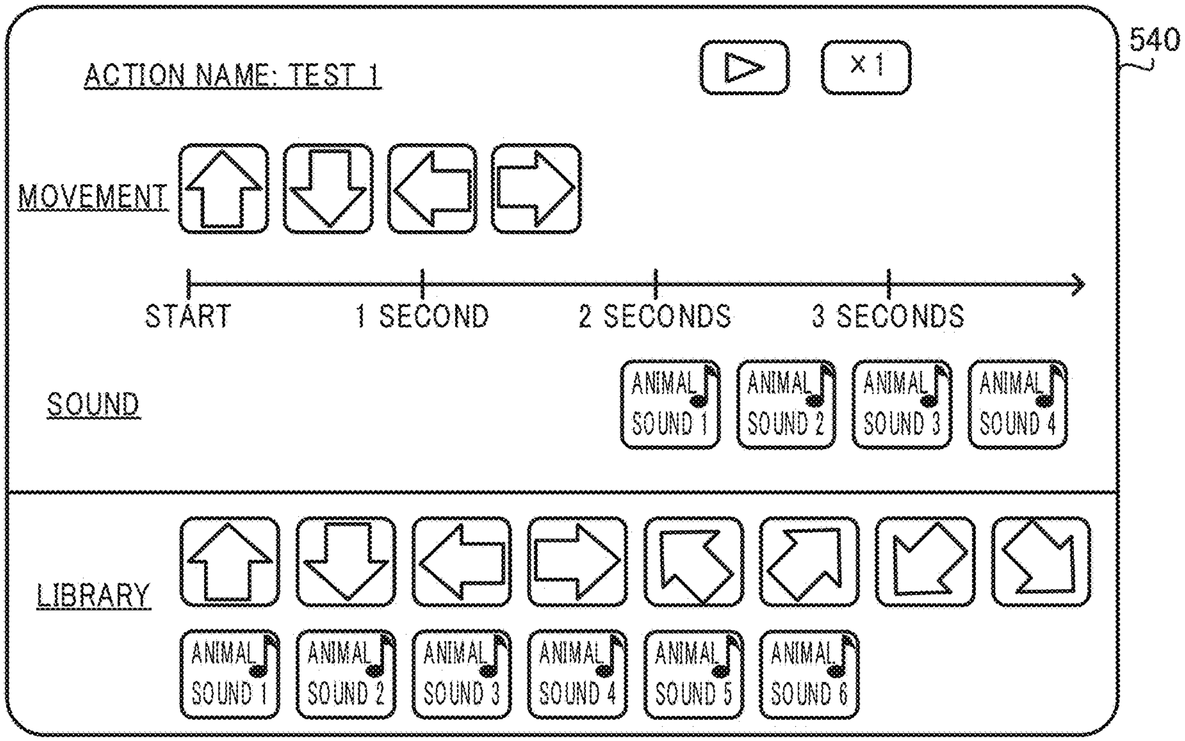
Figure 7:
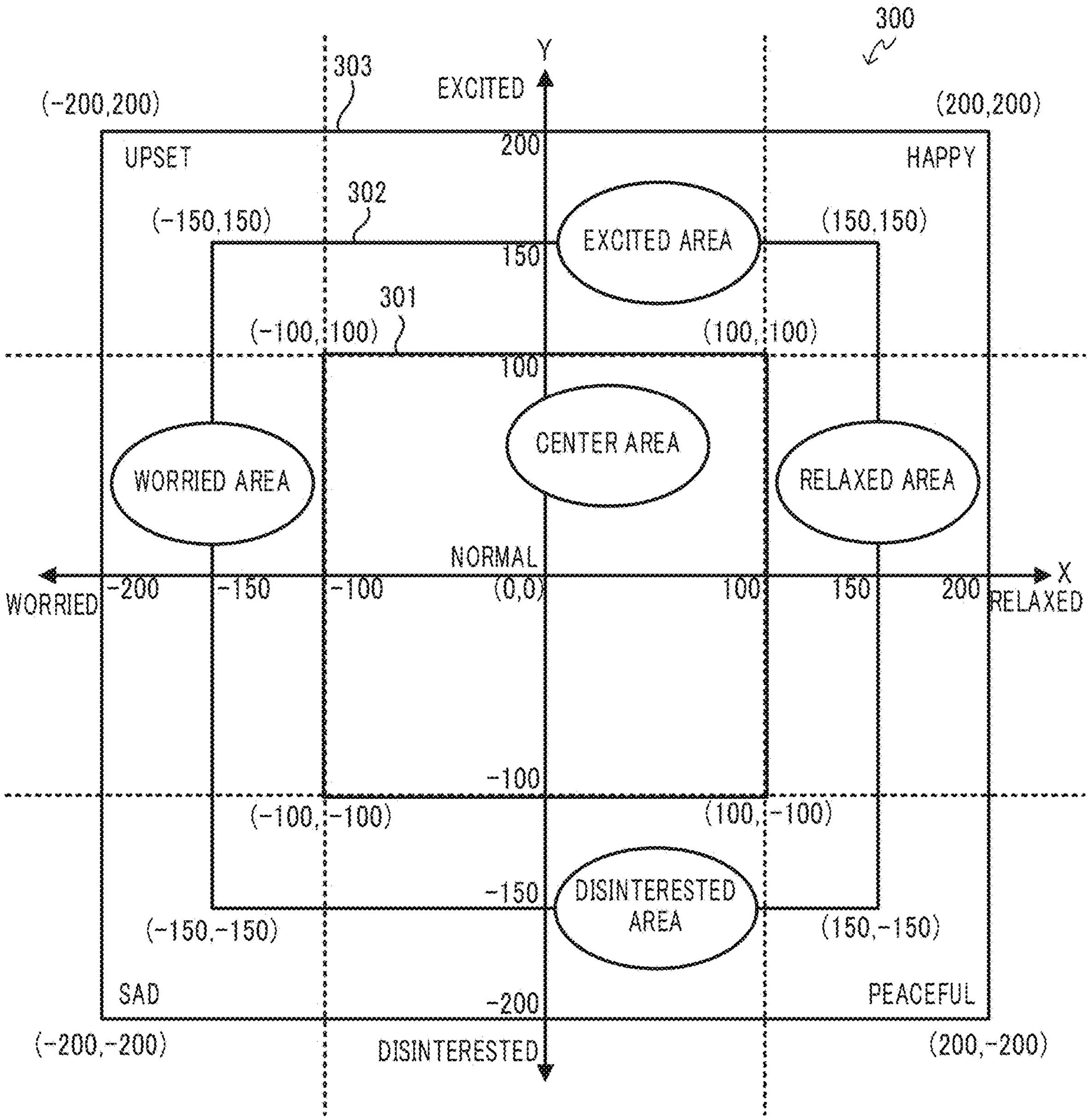
Figure 8:
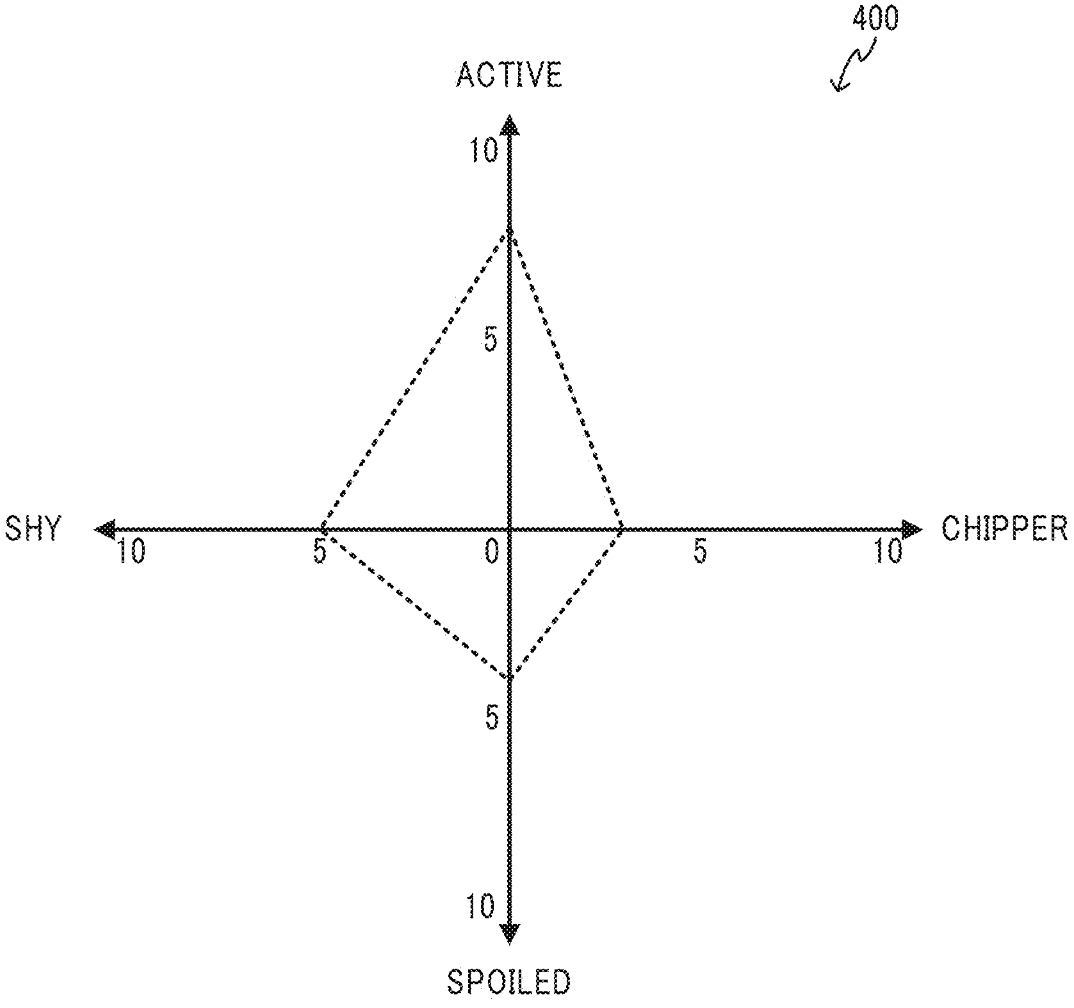
Figure 13:
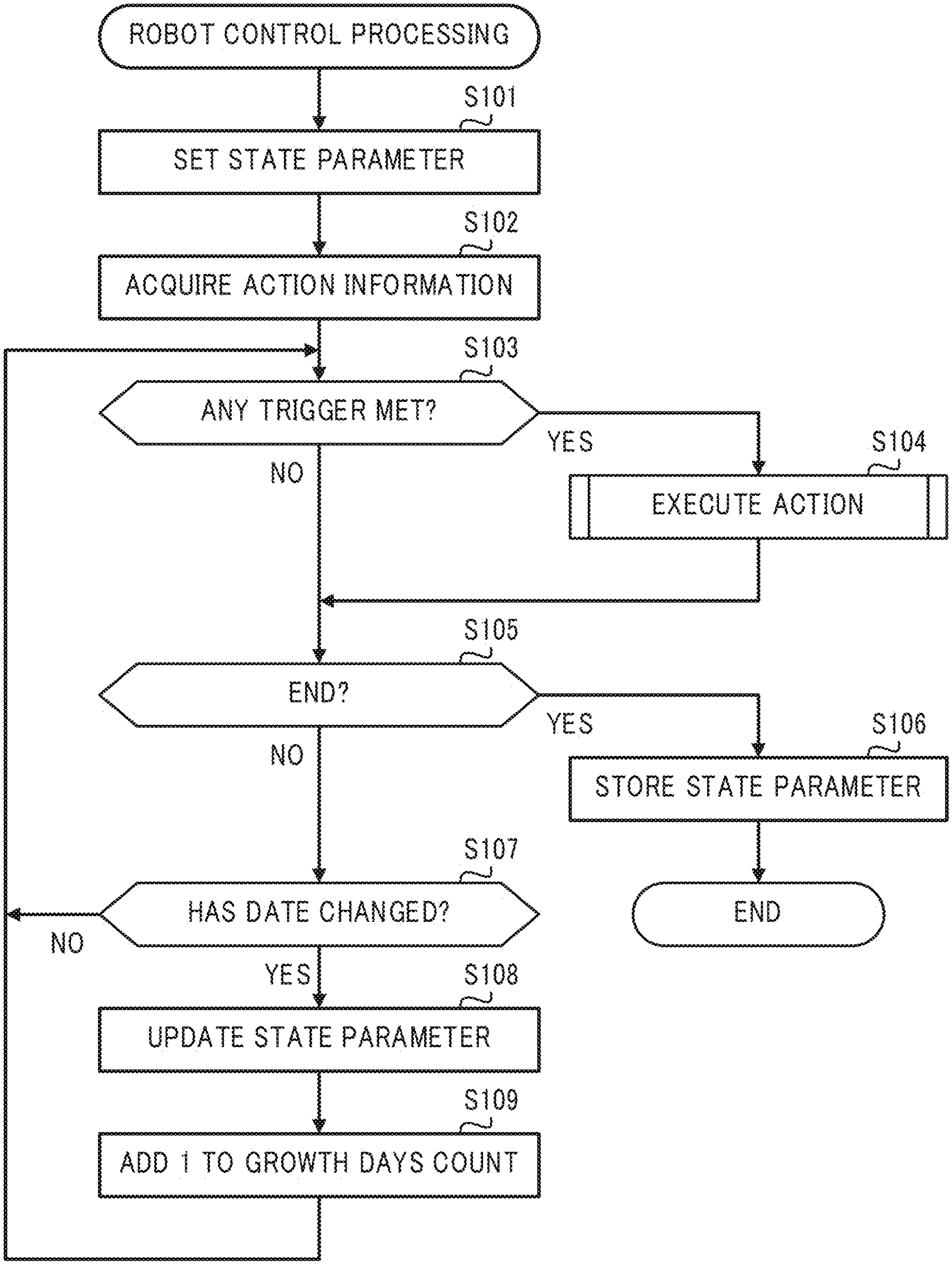
Figure 14:
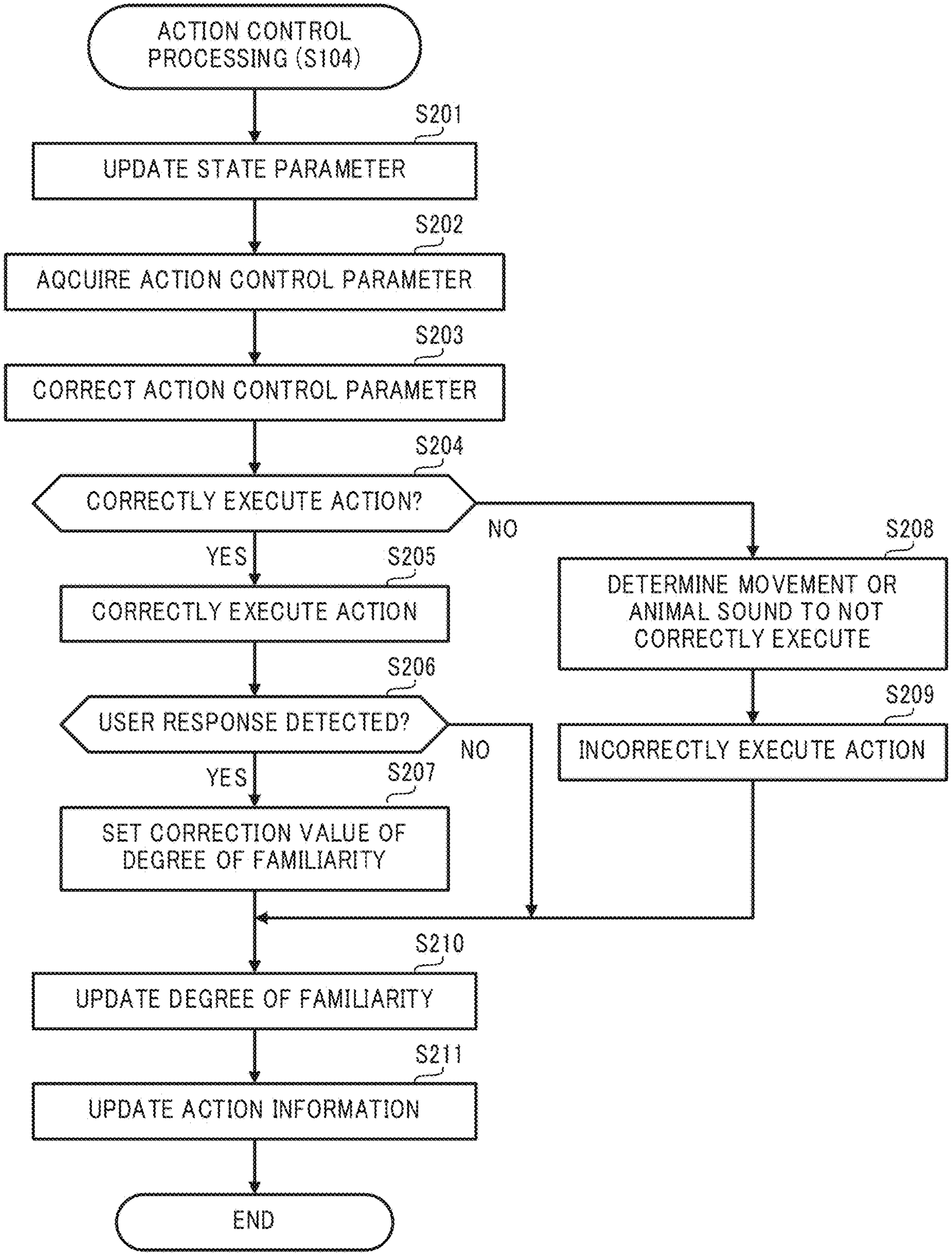

4 is a block diagram illustrating the configuration of a terminal device according to Embodiment 1;

FIG. 5 is a drawing illustrating an example of an action information creation screen according to Embodiment 1;

FIG. 6 is a drawing illustrating an example of action information according to Embodiment 1;

FIG. 7 is a drawing illustrating an example of an emotion map according to Embodiment 1;

FIG. 8 is a drawing illustrating an example of a personality value radar chart according to Embodiment 1;

FIG. 9 is a first drawing illustrating an example of a coefficient table according to Embodiment 1;

FIG. 10 is a second drawing illustrating an example of the coefficient table according to Embodiment 1;

FIG. 11 is a first drawing illustrating an example of a familiarity table according to Embodiment 1;

FIG. 12 is a second drawing illustrating an example of the familiarity table according to Embodiment 1;

FIG. 13 is a flowchart illustrating the flow of robot control processing according to Embodiment 1; and FIG. 14 is a flowchart illustrating the flow of action control processing according to Embodiment 1.

DETAILED DESCRIPTION OF THE INVENTION

Hereinafter, embodiments of the present disclosure are described while referencing the drawings Note that, in the drawings, identical or corresponding components are denoted with the same reference numerals.

Embodiment 1

Figure 1:
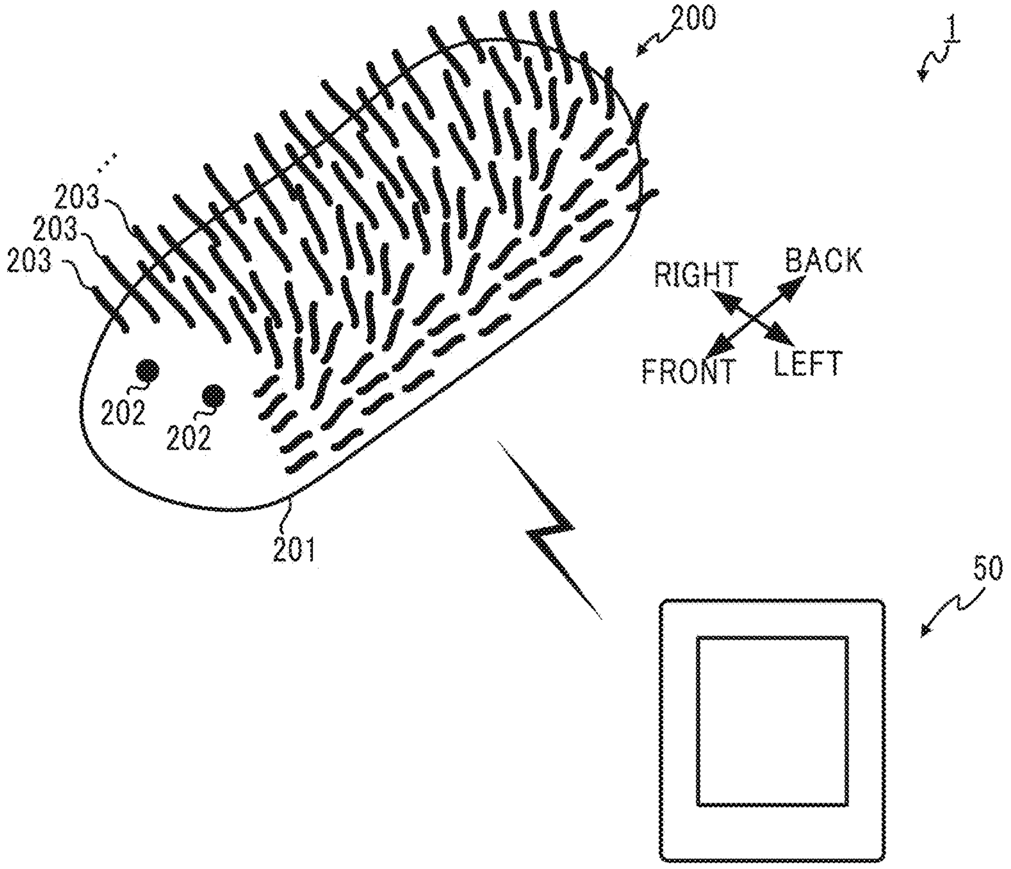
FIG. 1 is a drawing illustrating a schematic of the entire configuration of a robot system according to Embodiment 1.
Figure 2:
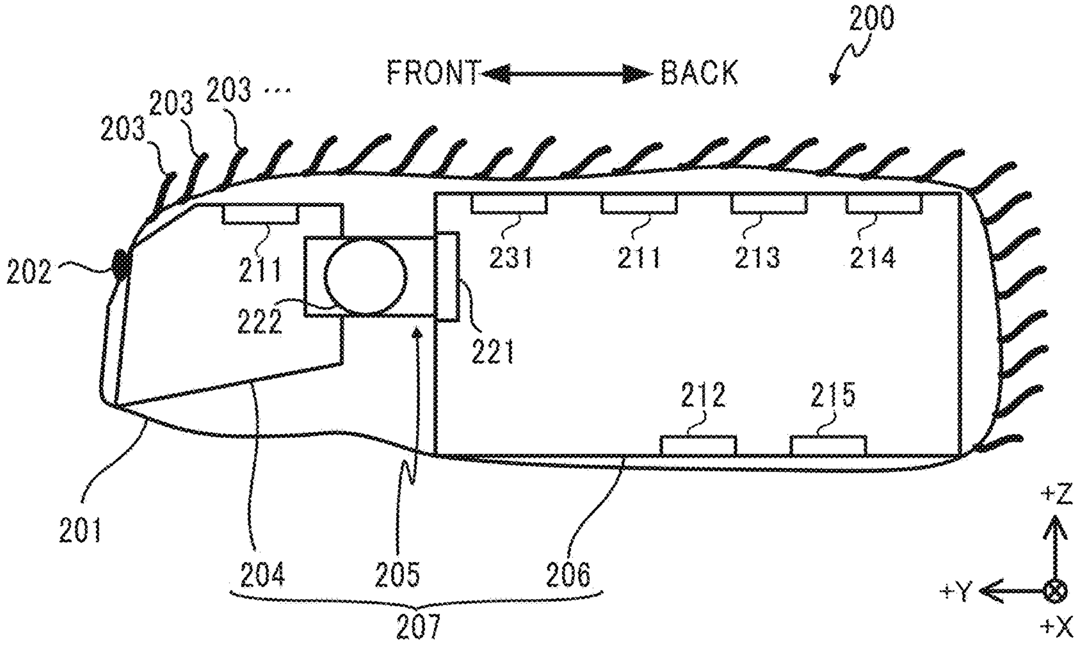
FIG. 2 is a cross-sectional view of a robot according to Embodiment 1, viewed from the side.

FIG. 1 schematically illustrates the configuration of a robot system 1 according to Embodiment 1. The robot system 1 includes a robot 200 and a terminal device 50. The robot 200 is an example of an electronic device according to Embodiment 1.

The robot 200 according to Embodiment 1 includes an exterior 201, decorative parts 202, bushy fur 203, head 204, coupler 205, torso 206, housing 207, touch sensor 211, acceleration sensor 212, microphone 213, illuminance sensor 214, and speaker 231 identical to those of the robot 200 disclosed in Unexamined Japanese Patent Application Publication No. 2023-115370 and, as such, description thereof is foregone.

The robot 200 according to Embodiment 1 includes a twist motor 221 and a vertical motor 222 identical to those of the robot 200 disclosed in Unexamined Japanese Patent Application Publication No. 2023-115370 and, as such, description thereof is foregone. The twist motor 221 and the vertical motor 222 of the robot 200 according to Embodiment 1 operate in the same manner as those of the robot 200 disclosed in Unexamined Japanese Patent Application Publication No. 2023-115370.

The robot 200 includes a gyrosensor 215. By using the acceleration sensor 212 and the gyrosensor 215, the robot 200 can detect a change of an attitude of the robot 200 itself, and can detect being picked up, the orientation being changed, being thrown, and the like by the user.

Note that, at least a portion of the acceleration sensor 212, the microphone 213, the illuminance sensor 214, the gyrosensor 215, and the speaker 231 is not limited to being provided on the torso 206 and may be provided on the head 204, or may be provided on both the torso 206 and the head 204.

Figure 3:
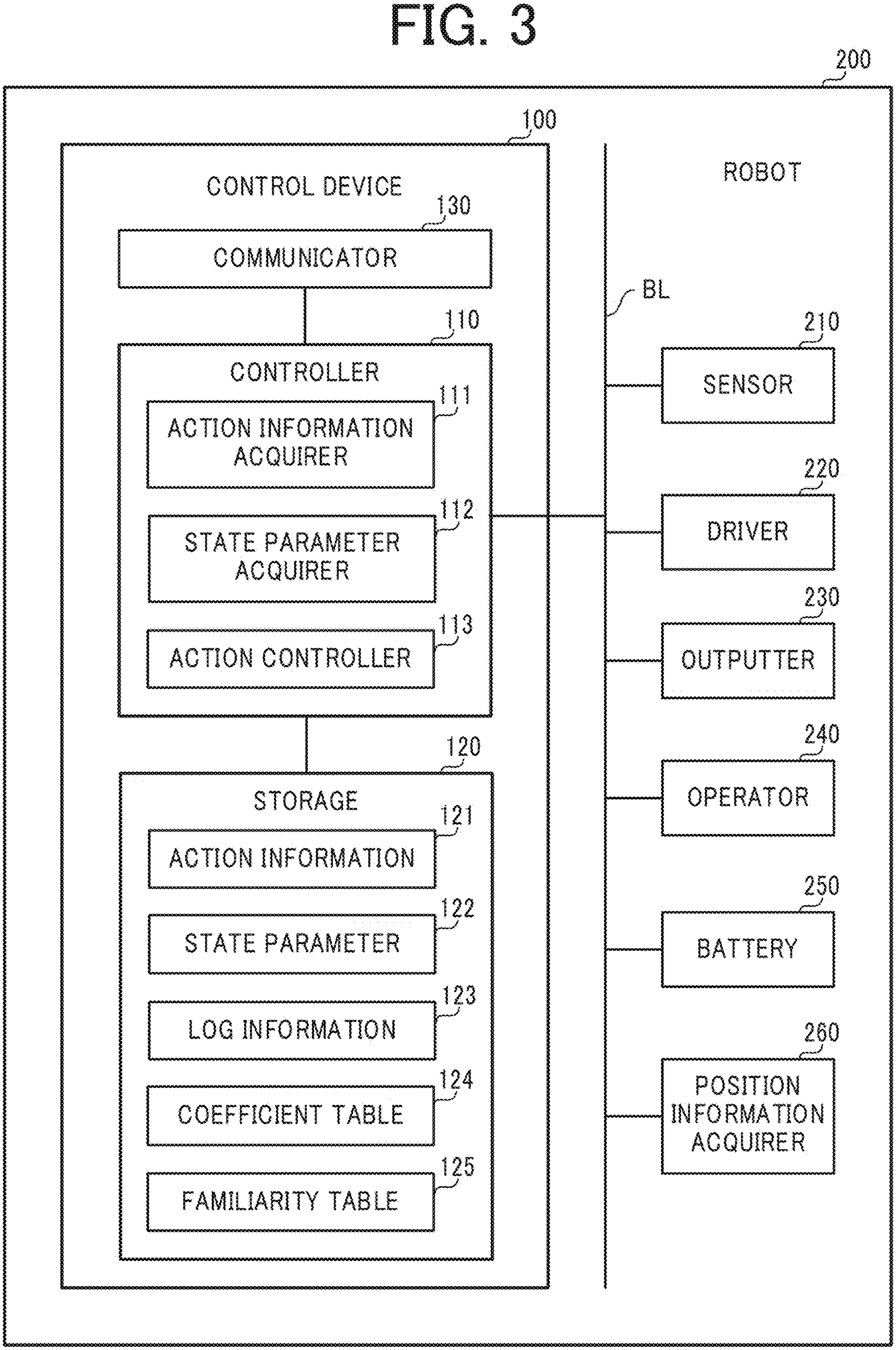
FIG. 3 is a block diagram illustrating the configuration of the robot according to Embodiment 1.

Next, the functional configuration of the robot 200 is described while referencing FIG. 3. As illustrated in FIG. 3, the robot 200 includes a control device 100, a sensor 210, a driver 220, an outputter 230, and an operator 240. In one example, these various components are connected via a bus line BL. Note that a configuration is possible in which, instead of the bus line BL, a wired interface such as a universal serial bus (USB) cable or the like, or a wireless interface such as Bluetooth (registered trademark) or the like is used.

The control device 100 is a device that controls the robot 200. The control device 100 includes a controller 110 that is an example of control means, a storage 120 that is an example of storage means, and a communicator 130 that is an example of communication means.

The controller 110 includes a central processing unit (CPU). In one example, the CPU is a microprocessor or the like and is a central processing unit that executes a variety of processing and computations. In the controller 110, the CPU reads out a control program stored in the ROM and controls the behavior of the entire robot 200 while using the RAM as working memory. Additionally, while not illustrated in the drawings, the controller 110 is provided with a clock function, a timer function, and the like, and can measure the date and time, and the like. The controller 110 may also be called a "processor."

The storage 120 includes read-only memory (ROM), random access memory (RAM), flash memory, and the like. The storage 120 stores an operating system (OS), application programs, and other programs and data used by the controller 110 to perform the various processes. Moreover, the storage unit 120 stores data generated or acquired as a result of the controller 110 performing the various processes.

The communicator 130 includes an interface for communicating with external devices of the robot 200. In one example, the communicator 130 communicates with external devices including the terminal device 50 in accordance with a known communication standard such as a wireless local area network (LAN), Bluetooth Low Energy (BLE, registered trademark), Near Field Communication (NFC), or the like.

The sensor 210 includes the touch sensor 211, the acceleration sensor 212, the gyrosensor 215, the illuminance sensor 214, and the microphone 213 described above. The sensor 210 is an example of detection means that detects an external stimulus.

The touch sensor 211 includes, for example, a pressure sensor and a capacitance sensor, and detects contacting by some sort of object. The controller 110 can, on the basis of detection values of the touch sensor 211, detect that the robot 200 is being pet, is being struck, and the like by the user.

The acceleration sensor 212 detects an acceleration applied to the torso 206 of the robot 200. The acceleration sensor 212 detects acceleration in each of the X axis direction, the Y axis direction, and the Z axis direction. That is, the acceleration sensor 212 detects acceleration on three axes.

In one example, the acceleration sensor 212 detects gravitational acceleration when the robot 200 is stationary. The controller 110 can detect the current attitude of the robot 200 on the basis of the gravitational acceleration detected by the acceleration sensor 212. In other words, the controller 110 can detect whether the housing 207 of the robot 200 is inclined from the horizontal direction on the basis of the gravitational acceleration detected by the acceleration sensor 212. Thus, the acceleration sensor 212 functions as an incline detection means that detects the inclination of the robot 200.

Additionally, when the user picks up or throws the robot 200, the acceleration sensor 212 detects, in addition to the gravitational acceleration, acceleration caused by the move of the robot 200. Accordingly, the controller 110 can detect the move of the robot 200 by removing the gravitational acceleration component from the detection value detected by the acceleration sensor 212.

The gyrosensor 215 detects an angular velocity from when rotation is applied to the torso 206 of the robot 200. Specifically, the gyrosensor 215 detects the angular velocity on three axes of rotation, namely rotation around the X axis direction, rotation around the Y axis direction, and rotation around the Z axis direction. It is possible to more accurately detect the move of the robot 200 by combining the detection value detected by the acceleration sensor 212 and the detection value detected by the gyrosensor 215.

Note that, at a synchronized timing (for example every 0.25 seconds), the touch sensor 211, the acceleration sensor 212, and the gyrosensor 215 respectively detect the strength of contact, the acceleration, and the angular velocity, and output the detection values to the controller 110.

The microphone 213 detects ambient sound of the robot 200. The controller 110 can, for example, detect, on the basis of a component of the sound detected by the microphone 213, that the user is speaking to the robot 200, that the user is clapping their hands, and the like.

The illuminance sensor 214 detects the illuminance of the surroundings of the robot 200. The controller 110 can detect that the surroundings of the robot 200 have become brighter or darker on the basis of the illuminance detected by the illuminance sensor 214.

The controller 110 acquires, via the bus line BL and as an external stimulus, detection values detected by the various sensors of the sensor 210. The external stimulus is a stimulus that acts on the robot 200 from outside the robot 200. Examples of the external stimulus include "there is a loud sound", "spoken to", "petted", "picked up", "turned upside down", "became brighter", "became darker", and the like.

In one example, the controller 110 acquires the external stimulus of "there is a loud sound" or "spoken to" by the microphone 213, and acquires the external stimulus of "petted" by the touch sensor 211. Additionally controller 110 acquires the external stimulus of "picked up" or "turned upside down" by the acceleration sensor 212 and the gyrosensor 215, and acquires the external stimulus of "became brighter" or "became darker" by the illuminance sensor 214.

Note that a configuration is possible in which the sensor 210 includes sensors other than the touch sensor 211, the acceleration sensor 212, the gyrosensor 215, and the microphone 213. The types of external stimuli acquirable by the controller 110 can be increased by increasing the types of sensors of the sensor 210.

The driver 220 includes the twist motor 221 and the vertical motor 222, and is driven by the controller 110. The twist motor 221 is a servo motor for rotating the head 204, with respect to the torso 206, in the left-right direction (the width direction) with the front-back direction as an axis. The vertical motor 222 is a servo motor for rotating the head 204, with respect to the torso 206, in the up-down direction (height direction) with the left-right direction as an axis. The robot 200 can express movements of turning the head 204 to the side by using the twist motor 221, and can express movements of lifting/lowering the head 204 by using the vertical motor 222.

The outputter 230 includes the speaker 231, and sound is output from the speaker 231 as a result of sound data being input into the outputter 230 by the controller 110. For example, the robot 200 emits a pseudo-animal sound as a result of the controller 110 inputting animal sound data of the robot 200 into the outputter 230.

A configuration is possible in which, instead of the speaker 231, or in addition to the speaker 231, a display such as a liquid crystal display, a light emitter such as a light emitting diode (LED), or the like is provided as the outputter 230, and emotions such as joy, sadness, and the like are displayed on the display, expressed by the color and brightness of the emitted light, or the like.

The operator 240 includes an operation button, a volume knob, or the like. In one example, the operator 240 is an interface for receiving user operations such as turning the power ON/OFF, adjusting the volume of the output sound, and the like.

A battery 250 is a rechargeable secondary battery, and stores power to be used in the robot 200. The battery 250 is charged when the robot 200 has moved to a charging station.

A position information acquirer 260 includes a position information sensor that uses a global positioning system (GPS), and acquires current position information of the robot 200. Note that the position information acquirer 260 is not limited to GPS, and a configuration is possible in which the position information acquirer 260 acquires the position information of the robot 200 by a common method that uses wireless communication, or acquires the position information of the robot 200 through an application/software of the terminal device 50.

The controller 110 functionally includes an action information acquirer 111 that is an example of action information acquiring means, a state parameter acquirer 112 that is an example of state controlling means, an action controller 113 that is an example of action controlling means, and a degree of familiarity setter 114 that is an example of degree of familiarity setting means. In the controller 110, the CPU performs control and reads the program stored in the ROM out to the RAM and executes that program, thereby functioning as the various components described above.

Additionally, the storage 120 stores action information 121, a state parameter 122, log information 123, a coefficient table 124, and an familiarity table 125.

Figure 4:
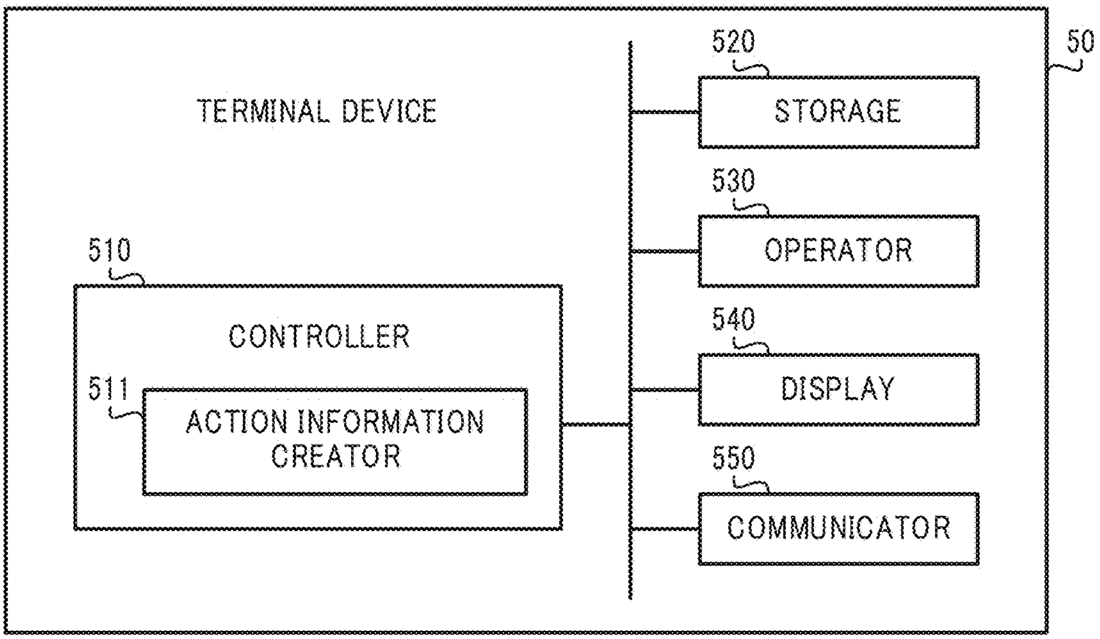

Next, the configuration of the terminal device 50 is described while referencing FIG. 4. The terminal device 50 is an operation terminal that is operated by the user. In one example, the terminal device 50 is a general purpose information processing device such a personal computer, a smartphone, a tablet terminal, a wearable terminal, or the like. As illustrated in FIG. 4, the terminal device 50 includes a controller 510, a storage 520, an operator 530, a display 540, and a communicator 550.

The controller 510 includes a CPU. In the controller 110, the CPU reads a control program stored in the ROM and controls the operations of the entire terminal device 50 while using the RAM as working memory. The controller 510 may also be called a "processor."

The storage 520 includes a ROM, a RAM, a flash memory, and the like. The storage 520 stores programs and data used by the controller 510 to perform various processes. Moreover, the storage 520 stores data generated or acquired as a result of the controller 510 performing the various processes.

The operator 530 includes an input device such as a keyboard, a mouse, a touch pad, a touch panel, a touch pad, and the like, and receives operation inputs from the user.

The display 540 includes a display device such as a liquid crystal display or the like, and displays various images on the basis of control by the controller 510. The display 540 is an example of display means.

The communicator 550 includes a communication interface for communicating with external devices of the terminal device 50. In one example, the communicator 550 communicates with external devices including the robot 200 in accordance with a known communication standard such as a wireless LAN, BLE (registered trademark), NFC, or the like.

The controller 510 functionally includes an action information creator 511 that is an example of action information creating means. In the controller 510, the CPU performs control and reads the program stored in the ROM out to the RAM and executes that program, thereby functioning as the various components described above.

Returning to FIG. 3, in the control device 100 of the robot 200, the action information acquirer 111 acquires the action information 121. The action information 121 is information that defines actions to be executed by the robot 200. Here, the phrase "action to be executed by the robot 200" refers to a behavior, processing, or the like of the robot 200. Specifically, each action includes a combination of a plurality of elements, namely movements and/or sound outputs.

The "movement" refers to a physical motion of the robot 200, executed by driving of the driver 220. Specifically, the "movement" corresponds to moving the head 204 relative to the torso 206 by the twist motor 221 or the vertical motor 222. The "sound output" refers to outputting of various sounds such as animal sounds or the like from the speaker 231 of the outputter 230.

The action information 121 defines, by combinations of such movements and sound outputs (animal sounds), the actions that the robot 200 is to execute. A configuration is possible in which the action information 121 is incorporated into the robot 200 in advance, but it is possible for the user to freely create the action information 121 by operating the terminal device 50.

Returning to FIG. 4, in the control device 50 of the robot 200, the action information creator 511 acquires the action information 121. The user can create, by operating the operator 530, various information about actions that the user desires to cause to robot 200 to perform.

Specifically, the user operates the operation 530 to start up a programming application/software installed in advance on the terminal device 50. As a result, the action information creator 511 displays an action information 121 creation screen such as illustrated in FIG. 5, for example, on the display 540.

The execution order and execution timing of a movement and a sound output (animal sound) that the robot 200 is to be caused to execute can respectively be set in a movement field and a sound field of the creation screen. The user can, by selecting and combining movements and sounds from menus while viewing this creation screen, freely program an action that the robot 200 is to be caused to execute.

Specifically, in the example of FIG. 5, as the action having the action name "Test 1", a sequence is set in which the head 204 is sequentially moved up, left, and right, then, the sounds of animal sound 1, animal sound 2, animal sound 3, and animal sound 4 are sequentially output, and so on. The movements and sound outputs (animal sounds) that are selectable in the creation screen are prepared in advance as a library. The user can select, from the library, the movements or sound outputs that the robot 200 is to be caused to execute.

The action information 121 created by such user operations more specifically has the configuration illustrated in FIG. 6. Specifically, the action information 121 associates and defines, for each of the plurality of actions, an action name, a trigger, an action control parameter, an execution count, and a previous execution date and time.

The trigger is a condition for the robot 200 to execute the action. Upon the trigger defined for a certain action being met, that action is executed by the robot 200. In the example of FIG. 6, the action of "Test 1" is executed "Upon speech recognition", and the action of "Test 2" is executed "Upon speech recognition" or "upon head being petted."

Here, "Upon speech recognition" corresponds to a case in which the action name is recognized, by a speech recognition function of the robot 200, from speech of the user detected by the microphone 213. Additionally, "Upon head being petted" corresponds to a case in which the user petting of the head 204 of the robot 200 is detected by the touch sensor 211.

Note that the trigger is not limited to the examples described above, and various conditions may be used. For example, the trigger may be a case in which "There is a loud sound" is detected by the microphone 213, a case in which "Picked up" or "Turned upside down" is detected by the acceleration sensor 212 and the gyrosensor 215, or a case in which "Became brighter" or "Became darker" is detected by the illuminance sensor 214. These can be called triggers based on external stimuli detected by the sensor 210. Alternatively, the trigger may be "A specific time arrived" or "The robot 200 moved to a specific location." These can be called triggers not based on external stimuli.

Note that a configuration is possible in which, when an execution command is received from the terminal device 50, each action is executed regardless of the trigger defined in the action information 121.

The action control parameters are parameters for causing the robot 200 to execute each action. The action control parameters includes various items, namely a movement, an animal sound, an execution start timing, a movement parameter, and an animal sound parameter.

The movement item defines the types and order of the movements constituting each action. The animal sound item defines the types and order of the sound outputs constituting each action. The execution start timing defines a timing at which to execute each of the movements or animal sounds constituting each action. Specifically, the execution start timing defines, for each movement or animal sound, a timing that is an origin point for execution, and an amount of execution time.

The movement parameter defines, for each of the movements constituting each action, an amount of movement time and a movement distance of the twist motor 221 or the vertical motor 222 when executing that movement. The animal sound parameter defines, for each animal sound constituting each action, a volume of the sound output from the speaker 231 when executing that animal sound.

The execution count is a cumulative number of times that each action has been executed by the robot 200. An initial value of the execution count is 0. The execution count of each action is increased by 1 each time the robot 200 executes that action. The previous execution date and time is the date and time at which the robot 200 last executed each action.

The action information creator 511 creates, on the basis of user commands, the action information 121 having the data configuration described above. When the action information 121 is created, the action information creator 511 communicates with the robot 200 via the communicator 550, and sends the created action information 121 to the robot 200. In the robot 200, the action information acquirer 111 communicates with the terminal device 50 via the communicator 130, and acquires and saves, in the storage 120, the action information 121 created in the terminal device 50.

Returning to FIG. 3, in the control device 100 of the robot 200, the state parameter acquirer 112 acquires the state parameter 122. The state parameter 122 is a parameter for expressing the state of the robot 200. Specifically, the state parameter 122 includes: (1) an emotion parameter, (2) a personality parameter, (3) a battery level, (4) a current location, (5) a current time, and (6) a growth days count (development days count).

(1) Emotion Parameter

The emotion parameter is a parameter that represents a pseudo-emotion of the robot 200. The emotion parameter is expressed by coordinates (X, Y) on an emotion map 300.

As illustrated in FIG. 7, the emotion map 300 is expressed by a two-dimensional coordinate system with a degree of relaxation (degree of worry) axis as an X axis, and a degree of excitement (degree of disinterest) axis as a Y axis. An origin (0, 0) on the emotion map 300 represents an emotion when normal. As the value of the X coordinate (X value) is positive and the absolute value thereof increases, emotions for which the degree of relaxation is high are expressed and, as the value of the X coordinate (X value) is negative and the absolute value thereof increases, emotions for which the degree of worry is high are expressed. As the value of the Y coordinate (Y value) is positive and the absolute value thereof increases, emotions for which the degree of excitement is high are expressed and, as the value of the Y coordinate (Y value) is negative and the absolute value thereof increases, emotions for which the degree of disinterest is high are expressed.

The emotion parameter represents a plurality (in the present embodiment, four) of mutually different pseudo-emotions. In FIG. 10, of the values representing pseudo-emotions, the degree of relaxation and the degree of worry are represented together on one axis (X axis), and the degree of excitement and the degree of disinterest are represented together on another axis (Y axis). Accordingly, the emotion parameter has two values, namely the X value (degree of relaxation, degree of worry) and the Y value (degree of excitement, degree of disinterest), and points on the emotion map 300 represented by the X value and the Y value represent the pseudo-emotions of the robot 200. An initial value of the emotion parameter is (0, 0).

Note that, in FIG. 7, the emotion map 300 is expressed as a two-dimensional coordinate system, but the number of dimensions of the emotion map 300 may be set as desired. A configuration is possible in which the emotion map 300 is defined by one dimension, and one value is set as the emotion parameter. Additionally, a configuration is possible in which another axis is added and the emotion map 300 is defined by a coordinate system of three or more dimensions, and a number of values corresponding to the number of dimensions of the emotion map 300 are set as the emotion parameter.

The state parameter acquirer 112 calculates an emotion change amount that is an amount of change of that the X value and the Y value of the emotion parameter are increased or decreased. The emotion change amount is expressed by the following four variables: DXP and DXM respectively increase and decrease the X value of the emotion parameter. DYP and DYM respectively increase and decrease the Y value of the emotion parameter.

The state parameter acquirer 112 calculates an emotion change amount that is an amount of change that each of the X value and the Y value of the emotion parameter is increased or decreased. The emotion change amount is expressed by the following four variables.

DXP: Tendency to relax (tendency to change in the positive value direction of the X value on the emotion map)

DXM: Tendency to worry (tendency to change in the negative value direction of the X value on the emotion map)

DYP: Tendency to be excited (tendency to change in the positive value direction of the Y value on the emotion map)

DYM: Tendency to be disinterested (tendency to change in the negative value direction of the Y value on the emotion map)

The state parameter acquirer 112 updates the emotion parameter by adding or subtracting a value, among the emotion change amounts DXP, DXM, DYP, and DYM, corresponding to the external stimulus to or from the current emotion parameter. For example, when the head 204 is petted, the pseudo-emotion of the robot 200 is relaxed and, as such, the state parameter acquirer 112 adds the DXP to the X value of the emotion parameter. Conversely, when the head 204 is struck, the pseudo-emotion of the robot 200 is worried and, as such, the state parameter acquirer 112 subtracts the DXM from the X value of the emotion parameter. Which emotion change amount is associated with the various external stimuli can be set as desired. An example is given below.

The head 204 is petted (relax): X=X+DXP

The head 204 is struck (worry): X=X−DXM (these external stimuli can be detected by the touch sensor 211 of the head 204)

The torso 206 is petted (excite): Y=Y+DYP

The torso 206 is struck (disinterest): Y=Y−DYM (these external stimuli can be detected by the touch sensor 211 of the torso 206)

Held with head upward (happy): X=X+DXP and Y=Y+DYP

Suspended with head downward (sad): X=X−DXM and Y=Y−DYM (these external stimuli can be detected by the touch sensor 211 and the acceleration sensor 212)

Spoken to in kind voice (peaceful): X=X+DXP and Y=Y−DYM

Yelled at in loud voice (upset): X=X−DXM and Y=Y+DYP (these external stimuli can be detected by the microphone 213)

The sensor 210 acquires a plurality of external stimuli of different types by a plurality of sensors. The state parameter acquirer 112 derives various emotion change amounts in accordance with each individual external stimulus of the plurality of external stimuli, and sets the emotion parameter in accordance with the derived emotion change amounts.

The initial value of these emotion change amounts DXP, DXM, DYP, and DYM is 10, and the amounts increase to a maximum of 20. The state parameter acquirer 112 updates the various variables, namely the emotion change amounts DXP, DXM, DYP, and DYM in accordance with the external stimuli detected by the sensor 210.

Specifically, when the X value of the emotion parameter is set to the maximum value of the emotion map 300 even once in one day, the state parameter acquirer 112 adds 1 to the DXP, and when the Y value of the emotion parameter is set to the maximum value of the emotion map 300 even once in one day, the state parameter acquirer 112 adds 1 to the DYP. Additionally, when the X value of the emotion parameter is set to the minimum value of the emotion map 300 even once in one day, the state parameter acquirer 112 adds 1 to the DXM, and when the Y value of the emotion parameter is set to the minimum value of the emotion map 300 even once in one day, the state parameter acquirer 112 adds 1 to the DYM.

Thus, the state parameter acquirer 112 changes the emotion change amounts in accordance with a condition based on whether the value of the emotion parameter reaches the maximum value or the minimum value of the emotion map 300 (first condition based on external stimulus). As an example, assume that all of the initial values of the various variables of the emotion change amount are set to 10. The state parameter acquirer 112 increases the various variables to a maximum of 20 by updating the emotion change amounts described above. Due to this updating processing, each emotion change amount, that is, the degree of change of emotion, changes.

For example, when only the head 204 is petted multiple times, only the emotion change amount DXP increases and the other emotion change amounts do not change. As such, the robot 200 develops a personality of having a tendency to be relaxed. When only the head 204 is struck multiple times, only emotion change amount DXM increases and the other emotion change amounts do not change. As such the robot 200 develops a personality of having a tendency to be worried. Thus, the state parameter acquirer 112 changes the emotion change amounts in accordance with various external stimuli.

(2) Personality Parameter

The personality parameter is a parameter expressing the pseudo-personality of the robot 200. The personality parameter includes a plurality of personality values that express degrees of mutually different personalities. The state parameter acquirer 112 changes the plurality of personality values included in the personality parameter in accordance with external stimuli detected by the sensor 210.

Specifically, the state parameter acquirer 112 calculates four personality values on the basis of (Equation 1) below. Specifically, a value obtained by subtracting 10 from DXP that expresses a tendency to be relaxed is set as a personality value (chipper), a value obtained by subtracting 10 from DXM that expresses a tendency to be worried is set as a personality value (shy), a value obtained by subtracting 10 from DYP that expresses a tendency to be excited is set as a personality value (active), and a value obtained by subtracting 10 from DYM that expresses a tendency to be disinterested is set as a personality value (spoiled).

$$\text{Personality value (chipper)} = DXP - 10 \quad \text{(Equation 1)}$$

$$\text{Personality value (shy)} = DXM - 10$$

$$\text{Personality value (active)} = DYP - 10$$

$$\text{Personality value (spoiled)} = DYM - 10$$

As a result, as illustrated in FIG. 11, it is possible to generate a personality value radar chart 400 by plotting each of the personality value (chipper) on a first axis, the personality value (active) on a second axis, the personality value (shy) on a third axis, and the personality value (spoiled) on fourth axis. Since the various emotion change amount variables each have an initial value of 10 and increase up to 20, the range of the personality value is from 0 to 10.

Since the initial value of each of the personality values is 0, the personality at the time of birth of the robot 200 is expressed by the origin of the personality value radar chart 400. Moreover, as the robot 200 grows, the four personality values change, with an upper limit of 10, due to external stimuli and the like (manner in which the user interacts with the robot 200) detected by the sensor 210. Therefore, 11 to the power of 4=14,641 types of personalities can be expressed.

Thus, the robot 200 assumes various personalities in accordance with the manner in which the user interacts with the robot 200. That is, the personality of each individual robot 200 is formed differently on the basis of the manner in which the user interacts with the robot 200.

These four personality values are fixed when the juvenile period elapses and the pseudo-growth of the robot 200 is complete. In the subsequent adult period, the state parameter acquirer 112 adjusts four personality correction values (chipper correction value, active correction value, shy correction value, and spoiled correction value) in order to correct the personality in accordance with the manner in which the user interacts with the robot 200.

The state parameter acquirer 112 adjusts the four personality correction values in accordance with a condition based on where the area in which the emotion parameter has existed the longest is located on the emotion map 300. Specifically, the four personality correction values are adjusted as in (A) to (E) below.

(A) When the longest existing area is the relaxed area on the emotion map 300, the state parameter acquirer 112 adds 1 to the chipper correction value and subtracts 1 from the shy correction value.

(B) When the longest existing area is the excited area on the emotion map 300, the state parameter acquirer 112 adds 1 to the active correction value and subtracts 1 from the spoiled correction value.

(C) When the longest existing area is the worried area on the emotion map 300, the state parameter acquirer 112 adds 1 to the shy correction value and subtracts 1 from the chipper correction value.

(D) When the longest existing area is the disinterested area on the emotion map 300, the state parameter acquirer 112 adds 1 to the spoiled correction value and subtracts 1 from the active correction value.

(E) When the longest existing area is the center area on the emotion map 300, the state parameter acquirer 112 reduces the absolute value of all four of the personality correction values by 1.

Note that the various areas of relaxed, excited, worried, disinterested, and center are examples and, for example, a configuration is possible in which the emotion map 300 is divided into more detailed areas such as happy, excited, upset, sad, peaceful, normal, and the like.

When setting the four personality correction values, the state parameter acquirer 112 calculates the four personality values in accordance with (Equation 2) below.

$$\text{Personality value (chipper)} = DXP - 10 + \text{chipper correction value} \quad \text{(Equation 2)}$$

$$\text{Personality value (shy)} = DXM - 10 + \text{shy correction value}$$

$$\text{Personality value (active)} = DYP - 10 + \text{active correction value}$$

$$\text{Personality value (spoiled)} = DYM - 10 + \text{spoiled correction value}$$

(3) Battery Level

The battery level is the remaining amount of power stored in the battery 250, and is a parameter expressing a pseudo degree of hunger of the robot 200. The state parameter acquirer 112 acquires information about the current battery level by a power supply controller that controls charging and discharging of the battery 250.

(4) Current Location

The current location is the location at which the robot 200 is currently positioned. The state parameter acquirer 112 acquires information about the current position of the robot 200 by the position information acquirer 260.

More specifically, the state parameter acquirer 112 references past position information of the robot 200 stored in the log information 123. The log information 123 is data in which past action data of the robot 200 is recorded. Specifically, the log information 123 includes the past position information, emotion parameters, and personality parameters of the robot 200, data expressing changes in the state parameters 122 such as the battery level, and sleep data expressing past wake-up times, bed times, and the like of the robot 200.

The state parameter acquirer 112 determines that the current location is home when the current location matches a position where the record frequency is the highest. When the current location is not the home, the state parameter acquirer 112 determines, on the basis of the past record count of that location in the log information 123, whether the current location is a location visited for the first time, a frequently visited location, a location not frequently visited, or the like, and acquires determination information thereof. For example, when the past record count is five times or greater, the state parameter acquirer 112 determines that the current location is a frequently visited location, and when the past record count is less than five times, the state parameter acquirer 112 determines that the current location is a location not frequently visited.

(5) Current Time

The current time is the time at present. The state parameter acquirer 112 acquires the current time by a clock provided to the robot 200. Note that, as with the acquisition of the position information, the acquisition of the current time is not limited to this method.

More specifically, the state parameter acquirer 112 references a present day wake-up time and a past average bed time recorded in the log information 123 to determine whether the current time is immediately after the wake-up time of the present day or immediately before the bed time.

The log information 123 includes sleep data. While not illustrated in the drawings, the sleep data includes a sleep log and compiled sleep data. The past wake-up time and bed time of the robot 200 are recorded every day in the sleep log. The compiled sleep data is data compiled from the sleep log, and the average wake-up time and the average bed time for every day are recorded in the compiled sleep data.

in one example, when the current time is within 30 minutes after the wake-up time of the present day, the state parameter acquirer 112 determines that the current time is immediately after the wake-up time of the present day. Additionally, when the current time is within 30 minutes before the past average bed time, the state parameter acquirer 112 determines that it is immediately before the bed time.

While not illustrated in the drawings, the past nap times of the robot 200 are recorded in the sleep data. The state parameter acquirer 112 references the past nap times recorded in the log information 123 to determine whether the current time corresponds to the nap time.

(6) Growth Days Count (Development Days Count)

The growth days count expresses the number of days of pseudo-growth of the robot 200. The robot 200 is pseudo-born at the time of first start up by the user after shipping from the factory, and grows from a juvenile to an adult over a predetermined growth period. The growth days count corresponds to the number of days since the pseudo-birth of the robot 200.

An initial value of the growth days count is 1, and the state parameter acquirer 112 adds 1 to the growth days count for each passing day. In one example, the growth period in which the robot 200 grows from a juvenile to an adult is 50 days, and the 50-day period that is the growth days count since the pseudo-birth is referred to as a "juvenile period (first period)." When the juvenile period elapses, the pseudo-growth of the robot 200 ends. A period after the completion of the juvenile period is called an "adult period (second period)."

During the juvenile period, each time the pseudo growth days count of the robot 200 increases one day, the state parameter acquirer 112 increases the maximum value and the minimum value of the emotion map 300 both by two. Regarding an initial value of the size of the emotion map 300, as illustrated by a frame 301, a maximum value of both the X value and the Y value is 100 and a minimum value is −100. When the growth days count exceeds half of the juvenile period (for example, 25 days), as illustrated by a frame 302, the maximum value of the X value and the Y value is 150 and the minimum value is −150. When the juvenile period elapses, the pseudo-growth of the robot 200 ends. At this time, as illustrated by a frame 303, the maximum value of the X value and the Y value is 200 and the minimum value is −200. Thereafter, the size of the emotion map 300 is fixed.

A settable range of the emotion parameter is defined by the emotion map 300. Thus, as the size of the emotion map 300 expands, the settable range of the emotion parameter expands Due to the settable range of the emotion parameter expanding, richer emotion expression becomes possible and, as such, the pseudo-growth of the robot 200 is expressed by the expanding of the size of the emotion map 300.

Returning to FIG. 3, the action controller 113 causes the robot 200 to execute various actions corresponding to the situation, on the basis of the action information 121 acquired by the action information acquirer 111.

The action controller 113 determines, on the basis of detection results and the like from the sensor 210, whether any trigger among the plurality of triggers defined in the action information 121 is met. For example, the action controller 113 determines whether speech of the user is recognized, whether the head 204 of the robot 200 is petted, whether a specific time has arrived, and whether any predetermined trigger in the action information 121, such as the robot 200 moved to a specific location, is met. When, as a result of the determination, any trigger is met, the robot 200 is caused to execute the action corresponding to the met trigger.

When any trigger is met, the action controller 113 references the action information 121 and identifies the action control parameters set for the action corresponding to the met trigger. Specifically, the action controller 113 identified, as the action control parameters, a combination of movements or animal sounds that are elements constituting the action corresponding to the met trigger, the execution start timing of each element, and the movement parameter or the animal sound parameter that is the parameter of each element. Then, on the basis of the identified action control parameters, the action controller 113 drives the driver 220 or outputs the sound from the speaker 231 to cause the robot 200 to execute the action corresponding to the met trigger.

More specifically, the action controller 113 corrects, on the basis of the state parameters 122 acquired by the state parameter acquirer 112, the action control parameters identified from the action information 121. By doing this, it is possible to add changes to the actions in accordance with the current state of the robot 200, and it is possible to realistically imitate a living creature.

The action controller 113 references the coefficient table 124 to correct the action control parameters. As illustrated in FIGS. 9 and 10, the coefficient table 124 defines correction coefficients for each state parameter 122, namely (1) the emotion parameter, (2) the personality parameter, (3) the battery level, (4) the current location, and (5) the current time. Note that, while omitted from the drawings, the coefficient table 124 may define a correction coefficient for (6) the growth days count.

The correction coefficients are coefficients for correcting the action control parameters identified from the action information 121. Specifically, each correction coefficients are defined by an action direction and a weighting coefficient for each of a speed and an amplitude of a vertical movement by the vertical motor 222, a speed and an amplitude of a left-right movement by the twist motor 221, and a movement start time lag.

More specifically, the action controller 113 determines, for the following (1) to (5), that state to which the current state of the robot 200, expressed by the state parameters 122 acquired by the state parameter acquirer 112, corresponds. Then, the action controller 113 corrects the action control parameters using the correction coefficients corresponding to the current state of the robot 200.

(1) Is the current emotion parameter of the robot 200 happy, upset, excited, sad, disinterested, or normal? In other words, are the coordinates (X, Y) expressing the emotion parameter positioned in the area labeled "happy", "upset", "sad", "disinterested", or "normal" on the emotion map 300 illustrated in FIG. 7.

(2) Is the current personality parameter of the robot 200 chipper, active, shy, or spoiled? In other words, which of the four personality values of chipper, active, shy, and spoiled is the greatest?

(3) Is the current battery level of the robot 200 70% or greater, between 70% and 30%, or 30% or less?

(4) Is the current location of the robot 200 the home, a frequently visited location, a location not frequently visited, or a location visited for the first time?

(5) Is the current time immediately after waking up, a nap time, or immediately before bed time?

As an example, in the coefficient table 124 illustrated in FIG. 10, when the current time corresponds to immediately after waking up, an action direction of both the speed and the amplitude is defined as "−" (negative) for both the vertical movement and the left-right movement, and the weighting coefficient is defined as "0.2." As such, on the basis of the values acquired from the action information 121, the action controller 113 lengthens the movement time by 20% and shortens the movement distance by 20%. In other words, the action controller 113 slows the movement of the robot 200 by 20% of normal, and reduces the size of the movement by 20%.

In the coefficient table 124 illustrated in FIG. 10, the action direction of the movement start time lag is defined as "+" (positive), and the weighting coefficient is defined as "0.2." As such, on the basis of the values set in the action information 121, the action controller 113 slows the execution start timing by 20% of normal. By correcting using such correction coefficients, the actions are executed with somewhat slower movements than the normal movements when in a sleepy state immediately after waking up, thereby making it possible to express that sleepy state.

In addition to (5) the current time described above, the action controller 113 identifies, for each state, namely (1) the emotion parameter, (2) the personality parameter, (3) the battery level, and (4) the current location, the correction coefficients of the corresponding state from the coefficient table 124. Then, the action controller 113 corrects the action control parameters using the sum total of the correction coefficients corresponding to all of (1) to (5).

Next, a specific example is described in which (1) the current emotion parameter corresponds to happy, (2) the current personality parameter corresponds to chipper, (3) the current battery level corresponds to 30% or less, (4) the current location corresponds to location visited for the first time, and (5) the current time corresponds to immediately after waking up. In this case, when referencing the coefficient table 124 illustrated in FIGS. 9 and 10, the sum total of the correction coefficients for each of the speed and the amplitude of the vertical movement is calculated as "+0.2+0.1−0.3−0.2−0.2=−0.4", and the sum total of the correction coefficients for each of the speed and the amplitude of the left-right movement is calculated as "+0.2+0−0.3−0.2−0.2=−0.5." As such, on the basis of the values set in the action information 121, the action controller 113 lengthens the movement time of the vertical motor 222 by 40%, and shortens the movement distance by 40%. Furthermore, on the basis of the values acquired from the action information 121, the action controller 113 lengthens the movement time of the twist motor 221 by 50%, and shortens the movement distance by 50%.

The sum total of the correction coefficients of the movement start time lag is calculated as "+0+0+0.3+0.2+0.2=+0.7." As such, on the basis of the values acquired from the action information 121, the action controller 113 slows the execution start timing by 70% of normal.

Note that, while omitted from the drawings, the coefficient table 124 defines a correction coefficient for the animal sound in the same manner as for the movement. Specifically, the action controller 113 uses the correction coefficient corresponding to the state parameter 122 acquired from the state parameter acquirer 112 to correct the volume. Here, the volume is the animal sound parameter set for the action corresponding to the met trigger in the action information 121.

Thus, the action controller 113 corrects the action control parameters on the basis of the state parameters 122 acquired by the state parameter acquirer 112. Then, the action controller 113 causes the robot 200 to execute the action corresponding to the met trigger by causing the driver 220 to drive or outputting a sound from the speaker 231 on the basis of the corrected action control parameters.

More specifically, when causing the robot 200 to execute the action corresponding to the met trigger, the action controller 113 performs one of (1A) a first control for causing the robot 200 to correctly execute that action, and (1B) a second control for causing the robot 200 to incorrectly execute that action or for causing the robot 200 to not execute that action.

(1A) In the first control, causing the robot 200 to correctly execute the action means to control the robot 200 in accordance with the sequence defined for that action. Specifically, the first control corresponds to driving the driver 220 or outputting the sound from the speaker 231 correctly in accordance with the action control parameters corrected with the correction coefficients, when causing the robot 200 to execute the action corresponding to the met trigger.

(1B) In contrast, in the second control, causing the robot 200 to incorrectly execute the action means to control the robot 200 in accordance with sequence that differ at least in part from the sequence defined for that action or, in other words, to control the robot 200 so as to incorrectly execute at least a portion of that action incorrectly. Specifically, the second control corresponds to driving the driver 220 or outputting the sound from the speaker 231 not correctly in accordance with the action control parameters corrected with the correction coefficients, when causing the robot 200 to execute the action corresponding to the met trigger.

Here, incorrectly executing the action or, in other words, executing at least a portion of the action incorrectly means executing by a sequence that deviates from the sequence defined for that action. More specifically, incorrectly executing the action corresponds to omitting the executing of at least one element of the plurality of elements (movements or animal sounds) constituting that action, switching the execution order of at least one element with that of another element, or changing the action control parameters of at least one element.

As a specific example, for the action of "Test 1" illustrated in FIGS. 5 and 6, a sequence is defined in which the head 204 is sequentially moved up, down, left, and right, then, the sounds of animal sound 1, animal sound 2, animal sound 3, and animal sound 4 are sequentially output, and so on. Omitting at least one of the elements of the action corresponds to omitting the executing of at least one element of the 8 elements of the up, down, left, and right movements and the animal sounds 1 to 4. Additionally, switching the execution order of at least one element of the action with that of another element corresponds to, for example, switching the execution order of the up, down, left, and right movements, switching the execution order of the animal sounds 1 to 4, or the like. Moreover, changing the action control parameters of at least one element of the action corresponds to changing the action control parameter of at least one element to parameters different from the action control parameters corrected with the correction coefficients defined for that element (for example, shortening the distance that the motor is driven, shortening the amount of time that the animal sound is output, and the like).

Thus, the action controller 113 executes the first control or the second control in accordance with the situation and, as such, not only executes the action correctly every time, but also mistakes or omits a portion of the action, depending on the situation. Due to this, the actions of the robot 200 are not uniform, which allows the robot 200 to improve lifelikeness.

Returning to FIG. 3, in the control device 100 of the robot 200, the degree of familiarity setter 114 sets a degree of familiarity. Here, the degree of familiarity represents the degree of familiarity to the execution of the action by the robot 200. The degree of familiarity is defined for each action in the action information 121 illustrated in FIG. 6, and increases as the execution count of the corresponding action increases.

Specifically, the degree of familiarity setter 114 calculates, in accordance with a predetermined rule, the degree of familiarity of each of the plurality of actions executable by the robot 200, and stores the calculated degrees of familiarity in the storage 120 as a degree of familiarity table 125. As illustrated in FIG. 11, the degree of familiarity table 125 defines the degree of familiarity to each of the plurality of actions executable by the robot 200.

When the robot 200 executes any of the actions, the degree of familiarity setter 114 calculates, in accordance with Equation 3 below, a new degree of familiarity of the executed action. Then, the degree of familiarity setter 114 updates, to the calculated new degree of familiarity, the degree of familiarity of the executed action included in the action information 121.

New degree of familiarity=Current degree of familiarity+product of degree of familiarity coefficients+correction value based on external stimulus (Equation 3)

In Equation 3, the degree of familiarity coefficient is a coefficient for calculating the degree of familiarity of each action. As illustrated in FIG. 12, the degree of familiarity table 125 defines, in addition to the degree of familiarity of each action, a degree of familiarity coefficient for every state of the robot 200 expressed by the state parameters 122.

In Equation 3, the product of degree of familiarity coefficients is a product of the degree of familiarity coefficients corresponding to current state of the robot 200 in each of (1) the emotion parameter, (2) the personality parameter, (3) the battery level, (4) the current location, and (5) the current time. The degree of familiarity setter 114 references the degree of familiarity table 125 to calculate the product of degree of familiarity coefficients corresponding to the current state of the robot 200.

Next, as an example similar to that described above, in a case in which (1) the current emotion parameter corresponds to happy, (2) the current personality parameter corresponds to chipper, (3) the current battery level corresponds to 30% or less, (4) the current location corresponds to location visited for the first time, and (5) the current time corresponds to immediately after waking up, the degree of familiarity coefficients corresponding to each state in the degree of familiarity table 125 are defined as 1.2, 1.2, 0.6, 0.7, and 0.6. As such, the degree of familiarity setter 114 calculates the product of degree of familiarity coefficients as $1.2\times1.2\times0.6\times0.7\times0.6\approx0.36$.

The degree of familiarity setter 114 adds the product of degree of familiarity coefficients calculated in this manner to the degree of familiarity every time the robot 200 executes the action. Since the product of degree of familiarity coefficients is added to the degree of familiarity of the action every time that action is executed, the degree of familiarity of that action increases as the execution count of that action increases.

Furthermore, for the degree of familiarity coefficient, as illustrated in the degree of familiarity table 125 (2) of FIG. 12, values that differ in accordance with the state of the robot 200 are defined for (1) to (5). The degree of familiarity setter 114 uses such degree of familiarity coefficients to change, on the basis of the state of the robot 200 when the robot 200 is caused to execute an action, an amount of increase of the degree of familiarity of that action. Thus, the degree of familiarity setter 114 derives the degree of familiarity on the basis of the state of the robot 200.

For example, in the degree of familiarity table 125 (2) illustrated in FIG. 12, the degree of familiarity coefficient is greater when the emotion parameter corresponds to happy than when the emotion parameter corresponds to other emotions. Additionally, the degree of familiarity coefficient is less when the emotion parameter corresponds to disinterested than when the emotion parameter corresponds to other emotions. Moreover, the degree of familiarity coefficient is greater when the personality parameter corresponds to active or chipper than when the personality parameter corresponds to shy or spoiled. Thus, it is possible to express lifelikeness such as the robot 200 quickly learning actions due to the amount of increase of the degree of familiarity increasing when the robot 200 is in a good mood or when the personality of the robot 200 is positive, and not readily learning actions when the robot 200 is in a bad mood or when the personality of the robot 200 is negative.

Furthermore, in the degree of familiarity table 125 (2) illustrated in FIG. 12, the degree of familiarity coefficient is less when the battery level parameter corresponds to 30% or less than when the battery level parameter corresponds to other battery levels. The degree of familiarity coefficient is greater when the current location parameter of the robot 200 corresponds to home than when the current location parameter corresponds to other locations. The degree of familiarity coefficient is less when the current time parameter corresponds to immediately after waking up than when the current time parameter corresponds to other times. Thus, the robot 200 quickly learns actions at home, but does not readily learn actions when hungry or immediately after waking up.

In Equation 3, the correction value based on external stimulus is a correction value for correcting the degree of familiarity on the basis of an external stimulus relative to the action executed by the robot 200. When the sensor 210 detects an external stimulus during execution of the first control, or when the sensor 210 detects an external stimulus within a predetermined amount of time after the execution of the first control, the degree of familiarity setter 114 corrects the degree of familiarity on the basis of the external stimulus.

Specifically, the degree of familiarity setter 114 detects, by the sensor 210, a user response relative to the executed action as an external stimulus. In one example, the user demonstrates, as a response to the action executed by the robot 200, a positive response such as petting, praising, or the like, or a negative response such as striking, getting angry, or the like. The degree of familiarity setter 114 detects, by the various types of sensors of the sensor 210, such user responses while the robot 200 is being caused to execute the action and for a predetermined amount of time (for example, 1 minute) after the robot 200 is caused to execute the action.

Specifically, the degree of familiarity setter 114 uses the touch sensor 211 to detect the strength of contact of the user on the robot 200 and, on the basis of the strength of contact, determines whether the user is petting or striking the robot 200, that is, whether the user response is positive (petting) or negative (striking). Additionally, the degree of familiarity setter 114 detects the speech of the user by the microphone 213 and performs speech recognition of the detected speech to determines whether the user is praising or is angry at the robot 200, that is, whether the user response is positive or negative. Moreover, a configuration is possible in which the degree of familiarity setter 114 detects the speech of the user by the microphone 213 and senses a volume of the detected speech, and determines that the user is praising (is positive) when the volume is less than a predetermined value, and is angry (is negative) when the volume is greater than or equal to the predetermined value. Furthermore, a configuration is possible in which the degree of familiarity setter 114 determines that the robot 200 is rocked gently, rocked forcefully, hugged, turned upside down, or the like on the basis of detection values of the acceleration sensor 212 or the gyrosensor 215. Moreover, a configuration is possible in which the degree of familiarity setter 114 determines that the user response is positive when the robot 200 is rocked gently or hugged, and determines that the user response is negative when the robot 200 is rocket forcefully or turned upside down.

The degree of familiarity setter 114 sets the correction value based on external stimulus of Equation 3 when a user response such as described above is detected as an external stimulus. Then, the action controller 113 corrects the degree of familiarity with the set correction value. For example, when the user demonstrates a positive response to an action executed by the robot 200, the degree of familiarity setter 114 sets the correction value based on external stimulus to a positive value. Meanwhile, when the user demonstrates a negative response to an action executed by the robot 200, the degree of familiarity setter 114 sets the correction value based on external stimulus to a negative value.

Thus, the degree of familiarity setter 114 increases the degree of familiarity when the user response is positive, and decreases the degree of familiarity when the user response is negative. In other words, the degree of familiarity setter 114 increases the amount of increase of the degree of familiarity when the sensor 210 detects a positive user response as the external stimulus compared to when the sensor 210 detects a negative user response as the external stimulus.

Additionally, a configuration is possible in which the degree of familiarity setter 114 controls the correction value of the external stimulus of Equation 3 on the basis of a brightness detected by the illuminance sensor 214 when the action is executed. Specifically, a configuration is possible in which the degree of familiarity setter 114 increases the amount of increase of the degree of familiarity when the illuminance sensor 214 senses a brightness greater than or equal to a desired threshold compared to when the illuminance sensor 214 senses a brightness less than the desired threshold.

Thus, the degree of familiarity setter 114 increases the degree of familiarity of each action as the execution count of that action increases, and updates the degree of familiarity of each action in accordance with the current state of the robot 200 and the user response to that action.

When causing the robot 200 to execute an action corresponding to a met trigger, the action controller 113 determines the frequency at which to perform the first control, among the first control and the second control, on the basis of the degree of familiarity set for that action by the degree of familiarity setter 114. In other words, the frequency at which the first control is to be performed when the action controller 113 causes the robot 200 to execute the action corresponding to the met trigger changes in accordance with the degree of familiarity to that action.

When any trigger among the triggers of the plurality of actions defined in the action information 121 is met, before executing the action corresponding to the met trigger, the action controller 113 derives, in accordance with the current degree of familiarity of that action, the frequency at which the first control is to be performed.

For example, the action controller 113 derives 0.5 as the frequency when the current degree of familiarity of the action to be executed is 0 or greater and less than 5, derives 0.8 as the frequency when the current degree of familiarity of the action to be executed is 5 or greater and less than 10, and derives the frequency as 1.0 when the current degree of familiarity of the action to be executed is 10 or greater. Thus, as the frequency at which the first control is to be performed, the action controller 113 derives a frequency that increases as the current degree of familiarity of that action increases.

When the frequency is derived, the action controller 113 determines, on the basis of the derived frequency, whether to perform the first control or to perform the second control when causing the robot 200 to execute the action corresponding to the met trigger. For example, when the derived frequency is 0.5, the action controller 113 determines to perform the first control with a probability of 50%, and determines to perform the second control with a probability of the remaining 50%. When the derived frequency is 0.8, the action controller 113 determines to perform the first control with a probability of 80%, and determines to perform the second control with a probability of the remaining 20%. When the derived frequency is 1.0, the action controller 113 determines to perform the first control with a probability of 100%, and determines to not perform the second control. Thus, the action controller 113 determines to perform the first control with a probability that increases as the derived frequency increases.

In a case in which a determination to perform the first control is made, the action controller 113, when causing the robot 200 to execute the action corresponding to the met trigger, drives the driver 220 or outputs sounds from the speaker 231 correctly for all of the plurality of elements (movement or animal sounds) constituting that action, in accordance with the action control parameters corrected with the correction coefficients.

In contrast, in a case in which a determination to perform the second control is made, the action controller 113, when causing the robot 200 to execute a portion of the elements of the plurality of elements (movement or animal sounds) constituting the action corresponding to the met trigger, drives the driver 220 or outputs sounds from the speaker 231 not correctly in accordance with the action control parameters corrected with the correction coefficients. Specifically, the action controller 113 omits execution, switches the execution order, changes the action control parameters, or the like of a portion of the elements of the plurality of elements constituting the action corresponding to the met trigger.

Note that, when causing the robot 200 to executing an element other than the portion of elements of the plurality of elements constituting the met trigger, the action controller 113 drives the driver 220 or outputs the sound from the speaker 231 correctly in accordance with the action control parameters corrected with the correction coefficients.

Here, the portion of elements not correctly executed of the plurality of elements constituting the action corresponding to the met trigger may be randomly selected, or may be selected in accordance with a specific rule.

Next, the flow of robot control processing is described while referencing FIG. 13. The robot control processing illustrated in FIG. 12 is executed by the controller 110 of the control device 100, with the user turning ON the power of the robot 200 as a trigger. The robot control processing is an example of an electronic device control method.

When the robot control processing starts, the controller 110 sets the state parameters 122 (step S101). When the robot 200 is started up for the first time (the time of the first start up by the user after shipping from the factory), the controller 110 sets the various parameters, namely the emotion parameter, the personality parameter, and the growth days count to initial values (for example, 0). Meanwhile, at the time of starting up for the second and subsequent times, the controller 110 reads out the values of the various parameters stored in step S106, described later, of the robot control processing to set the state parameter 122. However, a configuration is possible in which the emotion parameters are all initialized to 0 each time the power is turned ON.

When the state parameters 122 are set, the controller 110 communicates with the terminal device 50 and acquires the action information 121 created on the basis of user operations performed on the terminal device 50 (Step S102). Note that, when the action information 121 is already stored in the storage 120, step S102 may be skipped.

When the action information 121 is acquired, the controller 110 determines whether any trigger among the triggers of the plurality of actions defined in the action information 121 is met (step S103).

When any trigger is met (step S103; YES), the controller 110 causes the robot 200 to execute the action corresponding to the met trigger (step S104). Details about the action control processing of step S104 are described while referencing the flowchart of FIG. 14. Step S104 is an example of a control step.

When the action control processing illustrated in FIG. 14 starts, the controller 110 updates the state parameters 122 (step S201). Specifically, in a case in which the trigger met in step S103 is based on an external stimulus, the controller 110 derives the emotion change amount corresponding to that external stimulus. Then, the controller 110 adds or subtracts the derived emotion change amount to or from the current emotion parameter to update the emotion change amount. Furthermore, in the juvenile period, the controller 110 calculates, in accordance with (Equation 1) described above, the various personality values of the personality parameter from the emotion change amount updated in step S108. Meanwhile, in the adult period, the controller 110 calculates, in accordance with (Equation 2) described above, the various personality values of the personality parameter from the personality correction values and the emotion change amount updated in step S108.

When the state parameters 122 are updated, the controller 110 references the action information 121 and acquires the action control parameters of the action corresponding to the met trigger (step S202). Specifically, the controller 110 acquires, from the action information 121, a combination of movements or animal sounds that are elements constituting the action corresponding to the met trigger, the execution start timing of each element, and the movement parameter or the animal sound parameter that is the parameter of each element.

When the action control parameters are acquired, the controller 110 corrects the action control parameters on the basis of the correction coefficients defined in the coefficient table 124 (step S203). Specifically, the controller 110 calculates the sum total of the correction coefficients corresponding to the state parameters 122 updated in step S201 among the correction coefficients defined in the coefficient table 124 for each of (1) the emotion parameter, (2) the personality parameter, (3) the battery level, (4) the current location, and (5) the current time. Then, the controller 110 corrects the movement parameter, the animal sound parameter, and the execution start timing with the calculated sum total of the correction coefficients.

When the action control parameters are corrected, the controller 110 determines whether to correctly execute the action corresponding to the met trigger (step S204). Specifically, the controller 110 references the degree of familiarity of the action corresponding to the met trigger in the action information 121, and derives, in accordance with degree of familiarity, the frequency at which the first control is to be performed. Then, the controller 110 determines, on the basis of the derived frequency, whether to perform the first control in which the action is executed correctly, or to perform the second control in which the action is executed incorrectly.

When the action is to be executed correctly (step S204; YES), the controller 110 causes the robot 200 to correctly execute the action corresponding to the met trigger (step S205). Specifically, the controller 110 causes the driver 220 to drive or outputs the sound from the speaker 231 correctly in accordance with the action control parameters corrected in step S204.

When the robot 200 is caused to correctly execute the action, the controller 110 determines whether a user response is detected during the execution of the action or within a predetermined amount of time after the execution of the action (step S206). Specifically, as the external stimulus, the controller 110 determines whether a response, such as a contact or a call or the like by the user, is detected by the sensor 210.

When a user response is detected (step S206; YES), the controller 110 sets, on the basis of the user response, the correction value for the degree of familiarity of the executed action (step S207). For example, when the user demonstrates a positive response such as petting, praising, or the like to the action executed by the robot 200, the controller 110 sets a positive value as the correction value. Meanwhile, when the user demonstrates a negative response such as striking or getting angry to the action executed by the robot 200, the controller 110 sets a negative value as the correction value.

When a user response is not detected (step S206; NO), the controller 110 skips the processing of step S207.

In contrast, when the action is not to be executed correctly (step S204; NO), the controller 110 determines, of the action corresponding to the met trigger, the movement or the animal sound to not execute correctly (step S208). Specifically, the controller 110 randomly or, in accordance with a specific rule, determines the portion of elements, among the plurality of elements (movements or animal sounds) constituting the action corresponding to the met trigger, to not execute correctly.

Next, the controller 110 causes the robot 200 to incorrectly execute the action corresponding to the met trigger (step S209). Specifically, the controller 110 omits execution, switches the execution order, changes the action control parameters, or the like for the movement or the animal sound determined in step S208. Then, for the other movements or the animal sound 1, the controller 110 drives the driver 220 or outputs the sound from the speaker 231 correctly in accordance with the action control parameters.

When the action is executed, the controller 110 updates the degree of familiarity of the executed action (step S210). Specifically, the controller 110 calculates, on the basis of the state parameters 122 updated in step S201, the product of the degree of familiarity coefficients. Then, in accordance with Equation 3, the controller 110 calculates a new degree of familiarity from the current degree of familiarity, the calculated product of degree of familiarity coefficients, and the correction value set in step S207. The controller 110 updates the degree of familiarity of the executed action in the degree of familiarity table 125 to the new degree of familiarity.

When the action is executed, the controller 110 updates the action information 121 (step S211). Specifically, the controller 110 adds 1 to the execution count of the executed action in the action information 121, and updates the previous execution date and time of the executed action in the action information 121 to the current date and time. Thus, the action control processing illustrated in FIG. 14 is ended.

Returning to FIG. 13, in step S103, when no trigger among the triggers of the plurality of actions is met (step S103; NO), the controller 110 skips step S104.

Next, the controller 110 determines whether to end the processing (step S105). For example, when the operator 240 receives a power OFF command of the robot 200 from the user, the processing is ended. When ending the processing (step S105; YES), the controller 110 stores the current the state parameters 122 in the non-volatile memory of the storage 120 (step S106), and ends the robot control processing illustrated in FIG. 13.

When not ending the processing (step S105; NO), the controller 110 uses the clock function to determine whether a date has changed (step S107). When the date has not changed (step S107; NO), the controller 110 executes step S103.

When the date has changed (step S107; YES), the controller 110 updates the state parameters 122 (step S108). Specifically, when it is during the juvenile period (for example, 50 days from birth), the controller 110 changes the values of the emotion change amounts DXP, DXM, DYP, and DYM in accordance with whether the emotion parameter has reached the maximum value or the minimum value of the emotion map 300. Additionally, when in the juvenile period, the controller 110 increases both the minimum value and the maximum value of the emotion map 300 by a predetermined increase amount (for example, 2). In contrast, when in the adult period, the controller 110 adjusts the personality correction values.

When the state parameters 122 are updated, the controller 110 adds 1 to the growth days count (step S109), and executes step S103. Then, as long as the robot 200 is operating normally, the controller 110 repeats the processing of steps S103 to S109.

As described above, when executing an action, the robot 200 according to Embodiment 1 performs one of the first control in which the action is correctly executed, and the second control in which the action is incorrectly executed. Moreover, the frequency at which the first control is performed changes in accordance with the degree of familiarity of the robot 200 to that action. Thus, whether the robot 200 executes the action correctly or executes the action incorrectly changes in accordance with the degree of familiarity to that action and, as such, it is possible to express the process of the robot 200 learning the action.

In particular, when an external stimulus is detected during the execution of the first control or within a predetermined amount of time after the execution of the first control, the robot 200 according to Embodiment 1 updates the degree of familiarity in accordance with the external stimulus. Due to this, even when an external stimulus for executing a specific action is applied, at an early stage when the degree of familiarity is low, the robot 200 clumsily executes that action without executing some of the procedures as defined. In contrast, when the user demonstrates a positive response when a correct action is executed, the degree of familiarity increases and the frequency at which the action is correctly executed gradually increases. As a result, it is possible to imitate the growth (development) of a living creature.

Embodiment 2

Next, Embodiment 2 is described. In Embodiment 2, as appropriate, descriptions of configurations and functions that are the same as described in Embodiment 1 are forgone.

In Embodiment 1, the degree of familiarity setter 114 updates the degree of familiarity of each action in accordance with the current state of the robot 200 and the user response to that action. In contrast, in Embodiment 2, instead of or in addition to the feature of Embodiment 1, the degree of familiarity setter 114 increases the degree of familiarity in accordance with an elapsed time from a pseudo-birth of the robot 200.

Here, the elapsed time from the pseudo-birth of the robot 200 corresponds, for example, to a growth days count of the state parameters 122. The degree of familiarity setter 114 sets the degree of familiarity immediately after the pseudo-birth of the robot 200 low, and increases the degree of familiarity as the growth days count increases. By increasing the degree of familiarity in accordance with the growth days count of the robot 200 in this manner, it is possible to express the process of the robot 200 learning the action as the robot 200 grows.

Furthermore, a configuration is possible in which, for example, the degree of familiarity setter 114 increases the degree of familiarity as the growth days count increases during a juvenile period but, when an adult period is reached, the increasing of the degree of familiarity as the growth days count increases is stopped. Thus, the robot 200 clumsily and incorrectly executes the actions in the juvenile period, and when the adult period is reached, the frequency at which the robot 200 correctly executes the actions increases. As such, it is possible to realistically express lifelikeness.

Modified Examples

Embodiments of the present disclosure are described above, but these embodiments are merely examples and do not limit the scope of application of the present disclosure. That is, various applications of the embodiments of the present disclosure are possible, and all embodiments are included in the scope of the present disclosure.

For example, in Embodiment 1, the degree of familiarity setter 114 derives the degree of familiarity to the action on the basis of the execution count of the action by the robot 200 and the state of the robot 200. Additionally, in Embodiment 2, the degree of familiarity setter 114 derives the degree of familiarity to the action also on the basis of the elapsed time from the pseudo-birth of the robot 200. However, the method for deriving the degree of familiarity is not limited thereto. In other words, a configuration is possible in which the degree of familiarity setter 114 derives the degree of familiarity to the action on the basis of at least one of the execution count of the action by the robot 200, the elapsed time from the pseudo-birth of the robot 200, and the state of the robot 200.

In the embodiment described above, the control device 100 is installed in the robot 200, but a configuration is possible in which the control device 100 is not installed in the robot 200 but, rather, is a separated device (for example, a server). When the control device 100 is provided outside the robot 200, the control device 100 communicates with the robot 200 via the communicator 130, the control device 100 and the robot 200 send and receive data to and from each other, and the control device 100 controls the robot 200 as described in the embodiments described above.

In the embodiment described above, the exterior 201 is formed in a barrel shape from the head 204 to the torso 206, and the robot 200 has a shape as if lying on its belly. However, the robot 200 is not limited to resembling a living creature that has a shape as if lying on its belly. For example, a configuration is possible in which the robot 200 has a shape provided with arms and legs, and resembles a living creature that walks on four legs or two legs.

Furthermore, the electronic device is not limited to a robot 200 that imitates a living creature. For example, provided that the electronic device is a device capable of expressing individuality by executing various actions, a configuration is possible in which the electronic device is a wristwatch or the like. Even for an electronic device other than the robot 200, it is possible to described that electronic device in the same manner as in the embodiments described above by providing the same configurations and functions as with the robot 200 described above, In the embodiment described above, in the controller 110, the CPU executes programs stored in the ROM to function as the various components, namely, the action information acquirer 111, the state parameter acquirer 112, the action controller 113, and the like. Additionally, in the controller 510, the CPU executes programs stored in the ROM to function as the various components, namely, the action information creator 511 and the like. However, in the present disclosure, the controller 110, 510 may include, for example, dedicated hardware such as an Application Specific Integrated Circuit (ASIC), a Field-Programmable Gate Array (FPGA), various control circuitry, or the like instead of the CPU, and this dedicated hardware may function as the various components, namely the action information acquirer 111 and the like. In this case, the functions of each of the components may be realized by individual pieces of hardware, or the functions of each of the components may be collectively realized by a single piece of hardware. Additionally, the functions of each of the components may be realized in part by dedicated hardware and in part by software or firmware.

It is possible to provide a robot 200 or a terminal device 50, provided in advance, with the configurations for realizing the functions according to the present disclosure, but it is also possible to apply a program to cause an existing information processing device or the like to function as the robot 200 or the terminal device 50 according to the present disclosure. That is, a configuration is possible in which a CPU or the like that controls an existing information processing apparatus or the like is used to execute a program for realizing the various functional components of the robot 200 or the terminal device 50 described in the foregoing embodiments, thereby causing the existing information processing device to function as the robot 200 or the terminal device 50 according to the present disclosure.

Additionally, any method may be used to apply the program. For example, the program can be applied by storing the program on a non-transitory computer-readable recording medium such as a flexible disc, a compact disc (CD) ROM, a digital versatile disc (DVD) ROM, and a memory card. Furthermore, the program can be superimposed on a carrier wave and applied via a communication medium such as the internet. For example, the program may be posted to and distributed via a bulletin board system (BBS) on a communication network. Moreover, a configuration is possible in which the processing described above is executed by starting the program and, under the control of the operating system (OS), executing the program in the same manner as other applications/programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A robot comprising:

a memory in which an action, that the robot is caused to execute as a response to a predetermined first external stimulus and that is defined by a user, is registered via wireless communication using a terminal device; and at least one processor, wherein:

the at least one processor changes a frequency at which the action, as the response, is to be incorrectly executed by the robot, based on at least one of (i) a performance count indicating a number of times that the robot has been caused to execute the response to the predetermined first external stimulus in the past, (ii) an elapsed time from a pseudo-birth of the robot, and (iii) a state of the robot, and the at least one processor decreases the frequency at which the action, as the response, is to be incorrectly executed by the robot at a time of subsequent detection of the predetermined first external stimulus, in response to (i) a predetermined second external stimulus being detected at a time of correctly executing the action as the response, or (ii) a predetermined amount of time elapsing after correctly executing the action as the response.

2. The robot according to claim 1, wherein the at least one processor changes the frequency at which the action, as the response, is to be incorrectly executed by the robot such that an amount of decrease of the frequency is greater in a case in which the predetermined second external stimulus is a positive external stimulus than in a case in which the predetermined second external stimulus is a negative external stimulus.

3. The robot according to claim 1, wherein the at least one processor controls such that the frequency at which the action, as the response, is to be incorrectly executed by the robot decreases as the elapsed time from the pseudo-birth of the robot increases.

4. The robot according to claim 1, wherein the at least one processor controls such that the frequency at which the action, as the response, is to be incorrectly executed by the robot decreases as the performance count indicating the number of times that the robot has been caused to execute the response to the predetermined first external stimulus in the past increases.

5. The robot according to claim 1, wherein the state of the robot is at least one of a pseudo-emotion of the robot expressed by a value of an emotion parameter, a pseudo-personality of the robot expressed by a value of a personality parameter, a battery level of the robot, a current location of the robot, and a current time of the robot.

6. The robot according to claim 1, wherein:

the action includes a plurality of elements, and the at least one processor, in a case in which the action, as the response, is is to be incorrectly executed by the robot, changes at least one of the plurality of elements to be different from a content defined by the user, and executes the response.

7. A control method executed by a robot including a memory in which an action, that the robot is caused to execute as a response to a predetermined first external stimulus and that is defined by a user, is registered via wireless communication using a terminal device, the method comprising:

control processing for changing a frequency at which the action, as the response, is to be incorrectly executed by the robot, based on at least one of (i) a performance count indicating a number of times that the robot has been caused to execute the response to the predetermined first external stimulus in the past, (ii) an elapsed time from a pseudo-birth of the robot, and (iii) a state of the robot, wherein the control processing comprises decreasing the frequency at which the action, as the response, is to be incorrectly executed by the robot at a time of subsequent detection of the predetermined first external stimulus, in response to (i) a predetermined second external stimulus being detected at a time of correctly executing the action as the response, or (ii) a predetermined amount of time elapsing after correctly executing the action as the response.

8. The control method according to claim 7, wherein the control processing changes the frequency at which the action, as the response, is to be incorrectly executed by the robot such that an amount of decrease of the frequency is greater in a case in which the predetermined second external stimulus is a positive external stimulus than in a case in which the predetermined second external stimulus is a negative external stimulus.

9. The control method according to claim 7, wherein the control processing controls such that the frequency at which the action, as the response, is to be incorrectly executed by the robot decreases as the elapsed time from the pseudo-birth of the robot increases.

10. The control method according to claim 7, wherein the control processing controls such that the frequency at which the action, as the response, is to be incorrectly executed by the robot decreases as the performance count indicating the number of times that the robot has been caused to execute the response to the predetermined first external stimulus in the past increases.

11. The control method according to claim 7, wherein the state of the robot is at least one of a pseudo-emotion of the robot expressed by a value of an emotion parameter, a pseudo-personality of the robot expressed by a value of a personality parameter, a battery level of the robot, a current location of the robot, and a current time of the robot.

12. The control method according to claim 7, wherein:

the action includes a plurality of elements, and the control processing, in a case in which the action, as the response, is to be incorrectly executed by the robot, changes at least one of the plurality of elements to be different from a content defined by the user, and executes the response.

13. A non-transitory recording medium storing a program readable by a robot including a memory in which an action, that the robot is caused to execute as a response to a predetermined first external stimulus and that is defined by a user, is registered via wireless communication using a terminal device, the program causing the computer to realize:

a control function for changing a frequency at which the action, as the response, is to be incorrectly executed by the robot, based on at least one of (i) a performance count indicating a number of times that the robot has been caused to execute the response to the predetermined first external stimulus in the past, (ii) an elapsed time from a pseudo-birth of the robot, and (iii) a state of the robot, wherein the control function comprises decreasing the frequency at which the action, as the response, is to be incorrectly executed by the robot at a time of subsequent detection of the predetermined first external stimulus, in response to (i) a predetermined second external stimulus being detected at a time of correctly executing the action as the response, or (ii) a predetermined amount of time elapsing after correctly executing the action as the response.

14. The non-transitory recording medium according to claim 13, wherein the control function changes the frequency at which the action, as the response, is to be incorrectly executed by the robot such that an amount of decrease of the frequency is greater in a case in which the predetermined second external stimulus is a positive external stimulus than in a case in which the predetermined second external stimulus is a negative external stimulus.

15. The non-transitory recording medium according to claim 13, wherein the control function controls such that the frequency at which the action, as the response, is to be incorrectly executed by the robot decreases as the elapsed time from the pseudo-birth of the robot increases.

16. The non-transitory recording medium according to claim 13, wherein the control function controls such that the frequency at which the action, as the response, is to be incorrectly executed by the robot decreases as the performance count indicating the number of times that the robot has been caused to execute the response to the predetermined first external stimulus in the past increases.

17. The non-transitory recording medium according to claim 13, wherein the state of the robot is at least one of a pseudo-emotion of the robot expressed by a value of an emotion parameter, a pseudo-personality of the robot expressed by a value of a personality parameter, a battery level of the robot, a current location of the robot, and a current time of the robot.

* * * * *